United States Patent
Atienza et al.

(10) Patent No.: US 9,975,973 B2
(45) Date of Patent: May 22, 2018

(54) ASYMMETRIC FLUORENYL-SUBSTITUTED SALAN CATALYSTS

(71) Applicant: ExxonMobil Chemical Patents Inc., Baytown, TX (US)

(72) Inventors: Crisita Carmen H. Atienza, Houston, TX (US); David A. Cano, Houston, TX (US); Meagan E. Evans, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days. days.

(21) Appl. No.: 15/241,997

(22) Filed: Aug. 19, 2016

(65) Prior Publication Data
US 2017/0096507 A1 Apr. 6, 2017

Related U.S. Application Data

(60) Provisional application No. 62/236,701, filed on Oct. 2, 2015.

(51) Int. Cl.
*C08F 4/76* (2006.01)
*C08F 4/64* (2006.01)
*C08F 210/16* (2006.01)
*C08F 4/60* (2006.01)
*C08F 4/659* (2006.01)

(52) U.S. Cl.
CPC ........ *C08F 210/16* (2013.01); *C08F 4/60189* (2013.01); *C08F 4/65912* (2013.01)

(58) Field of Classification Search
CPC .............. C08F 4/60175; C08F 4/64175; C08F 4/60189; C08F 4/64189
See application file for complete search history.

(56) References Cited

U.S. PATENT DOCUMENTS

| | | | |
|---|---|---|---|
| 5,308,811 A | 5/1994 | Suga et al. | |
| 5,830,820 A | 11/1998 | Yano et al. | |
| 5,928,982 A | 7/1999 | Suga et al. | |
| 5,973,084 A | 10/1999 | Suga et al. | |
| 6,103,657 A | 8/2000 | Murray | |
| 6,274,684 B1 | 8/2001 | Loveday et al. | |
| 6,333,423 B1 | 12/2001 | Kol et al. | |
| 6,368,999 B1 | 4/2002 | Speca | |
| 6,399,535 B1 | 6/2002 | Shih et al. | |
| 6,531,552 B2 | 3/2003 | Nakano et al. | |
| 6,559,090 B1 | 5/2003 | Shih et al. | |
| 6,596,827 B2 | 7/2003 | Kol et al. | |
| 6,664,348 B2 | 12/2003 | Speca | |
| 6,734,131 B2 | 5/2004 | Shih et al. | |
| 6,844,389 B2 | 1/2005 | Mehta et al. | |
| 6,900,321 B2 | 5/2005 | Boussie et al. | |
| 6,943,224 B2 | 9/2005 | Shih | |
| 7,183,348 B2 | 2/2007 | Reinking et al. | |
| 7,220,695 B2 | 5/2007 | Casty et al. | |
| 7,355,058 B2 | 4/2008 | Luo et al. | |
| 7,754,840 B2 | 7/2010 | Loveday et al. | |
| 7,973,116 B2 | 7/2011 | Hagadorn et al. | |
| 8,071,701 B2 | 12/2011 | Klosin et al. | |
| 8,080,613 B2 | 12/2011 | Moad et al. | |
| 8,110,518 B2 | 2/2012 | Marin et al. | |
| 8,575,284 B2 | 11/2013 | Luo et al. | |
| 8,791,217 B2 | 7/2014 | Hlavinka et al. | |
| 8,907,032 B2 | 12/2014 | Kol et al. | |
| 8,937,137 B2 | 1/2015 | Holtcamp et al. | |
| 8,952,114 B2 | 2/2015 | Giesbrecht et al. | |
| 8,957,171 B2 | 2/2015 | Giesbrecht et al. | |
| 8,957,172 B2 * | 2/2015 | Giesbrecht ............ | C08F 210/16 502/103 |
| 9,079,991 B2 | 7/2015 | Ker et al. | |
| 9,120,879 B2 | 9/2015 | Giesbrecht et al. | |
| 9,150,676 B2 | 10/2015 | Kol et al. | |
| 9,193,813 B2 | 11/2015 | Kol et al. | |
| 9,200,099 B2 | 12/2015 | Kol et al. | |
| 9,200,100 B2 | 12/2015 | Kol et al. | |
| 9,290,589 B2 * | 3/2016 | Evans ................... | C08F 110/02 |
| 2002/0019503 A1 | 2/2002 | Kol et al. | |
| 2002/0123582 A1 | 9/2002 | Speca | |
| 2002/0142912 A1 | 10/2002 | Boussie et al. | |
| 2003/0027950 A1 | 2/2003 | Uchino et al. | |
| 2003/0096698 A1 | 5/2003 | Shih et al. | |
| 2005/0148743 A1 | 7/2005 | Casty et al. | |
| 2006/0293470 A1 | 12/2006 | Cao et al. | |
| 2010/0227990 A1 | 9/2010 | Kuhlman et al. | |
| 2013/0035463 A1 | 2/2013 | Cann et al. | |
| 2013/0131294 A1 | 5/2013 | Hagadorn et al. | |
| 2013/0172498 A1 | 7/2013 | Hlavinka et al. | |

(Continued)

FOREIGN PATENT DOCUMENTS

EP 511665 A1 11/1992
EP 1 160 261 A1 12/2001
(Continued)

OTHER PUBLICATIONS

U.S. Appl. No. 15/051,421, filed Feb. 23, 2016, Atienza et al.
U.S. Appl. No. 61/779,435, filed Mar. 13, 2013, Holtcamp et al.
U.S. Appl. No. 62/149,799, filed Apr. 20, 2015, Ye et al.
U.S. Appl. No. 62/236,691, filed Oct. 2, 2015, Ye et al.
U.S. Appl. No. 62/236,712, filed Oct. 2, 2015, Atienza et al.
Gibson et al., "*Advances in Non-Metallocene Olefin Polymerization Catalysis*," Chemical Review, 2003, vol. 103, pp. 283-315.
U.S. Appl. No. 62/149,814, filed Apr. 20, 2015, Ye et al.
U.S. Appl. No. 62/168,302, filed May 29, 2015, Holtcamp et al.
U.S. Appl. No. 62/222,935, filed Sep. 24, 2015, Holtcamp et al.
U.S. Appl. No. 62/236,697, filed Oct. 2, 2015, Ye et al.
U.S. Appl. No. 62/236,720, filed Oct. 2, 2015, Atienza et al.
U.S. Appl. No. 62/236,727, filed Oct. 2, 2015, Ye et al.
Barroso et al., "Chiral Diarnine Bis(phenolate) TiIV and ZrIV Complexes—Synthesis, Structures and Reactivity," Eur. J. Inorg. Chem., 2011, pp. 4277-4290.

(Continued)

*Primary Examiner* — Rip A Lee

(57) ABSTRACT

Catalyst compounds and catalyst systems including an asymmetric Salan ligands having a fluorenyl moiety are disclosed. Methods of preparing such catalyst compounds and catalyst systems, polymerization processes using such catalysts systems and olefin polymers prepared according to such processes using the catalysts systems are described.

48 Claims, 2 Drawing Sheets

(56) References Cited

U.S. PATENT DOCUMENTS

| | | | |
|---|---|---|---|
| 2013/0345377 A1* | 12/2013 | Ker | C08F 210/16 526/147 |
| 2014/0031504 A1 | 1/2014 | Jacobsen et al. | |
| 2014/0039137 A1 | 2/2014 | Giesbrecht et al. | |
| 2014/0039138 A1 | 2/2014 | Giesbrecht et al. | |
| 2014/0039139 A1 | 2/2014 | Giesbrecht et al. | |
| 2014/0121341 A1 | 5/2014 | Holtcamp et al. | |
| 2014/0128557 A1 | 5/2014 | Giesbrecht et al. | |
| 2014/0221587 A1 | 8/2014 | Hagadorn et al. | |
| 2014/0275454 A1 | 9/2014 | Holtcamp et al. | |
| 2015/0141601 A1 | 5/2015 | Hagadorn et al. | |
| 2015/0329652 A1 | 11/2015 | Hlavinka | |
| 2017/0088641 A1 | 3/2017 | Holtcamp et al. | |
| 2017/0096506 A1 | 4/2017 | Ye et al. | |
| 2017/0096508 A1 | 4/2017 | Ye et al. | |
| 2017/0096509 A1 | 4/2017 | Atienza et al. | |
| 2017/0096510 A1 | 4/2017 | Ye et al. | |
| 2017/0096511 A1 | 4/2017 | Atienza et al. | |

FOREIGN PATENT DOCUMENTS

| | | |
|---|---|---|
| EP | 0 849 292 B1 | 8/2002 |
| JP | 1995033814 A | 2/1995 |
| JP | 2011089019 A | 5/2011 |
| JP | 2013124302 A | 6/2013 |
| WO | 97/48743 A1 | 12/1997 |
| WO | 01/42320 A1 | 6/2001 |
| WO | 02/088198 A1 | 11/2002 |
| WO | 2004/106390 A2 | 12/2004 |
| WO | 2005/075525 A2 | 8/2005 |
| WO | 2006/036748 A2 | 4/2006 |
| WO | 2007/018804 A1 | 2/2007 |
| WO | 2012/033670 A1 | 3/2012 |
| WO | 2012/098521 A1 | 7/2012 |
| WO | 2012/134614 A1 | 10/2012 |
| WO | 2012/134615 A1 | 10/2012 |
| WO | 2012/158260 A1 | 11/2012 |
| WO | 2013/028283 A1 | 2/2013 |
| WO | 2013/040276 A1 | 3/2013 |
| WO | 2014/143202 A1 | 9/2014 |
| WO | 2014/149361 A1 | 9/2014 |
| WO | 2015/088819 | 6/2015 |
| WO | 2017/039995 | 3/2017 |
| WO | 2017039994 | 3/2017 |

OTHER PUBLICATIONS

Bucheli et al., "Spherical Clay Conglomerates: A Novel Stationary Phase for Solid-Phase Extraction and 'Reversed-Phase' Liquid Chromatography," Analytical Chemistry, vol. 71(11), Jun. 1, 1999, pp. 2171-2178.

Busico et al., "Block Copolymers of Highly Isotactic Polypropylene via Controlled Ziegler-Natta Polymerization," Macromolecules, 2004, vol. 37, pp. 8201-8203.

Cipullo et al., "Improving the Behavior of Bis(phenoxyamine) Group 4 Metal Catalysts for Controlled Alkene Polymerization," Macromolecules, 2009, vol. 42, pp. 3869-3872.

Groysman et al., "From THF to Furan: Activity Tuning and Mechanistic Insight via Sidearm Donor Replacement in Group IV Amine Bis(phenolate) Polymerization Catalysts," Organometallics, 2003, vol. 22, pp. 3013-3015.

Groysman et al., "Diverse Structure—Activity Trends in Amine Bis(phenolate) Titanium Polymerization Catalysts," Organometallics, 2004, vol. 23, pp. 5291-5299.

Van Meurs et al., "Polyethylene Chain Growth on Zinc Catalyzed by Olefin Polymerization Catalysts: A Comparative Investigation of Highly Active Catalyst Systems across the Transition Series ," J. Am. Chem. Soc., 2005, vol. 127, pp. 9913-9923.

Reybuck et al., "Amine Bis(phenolate) Zirconium Complexes: Influence of Ligand Structure and Cocatalyst on Copolymerization Behaivor," Macromolecules, 2005, vol. 38, pp. 2552-2558.

Su et al., "Oxo-Bridged Bimetallic Group 4 Complexes Bearing Amine-Bis(benzotriazole phenolate) Derivatives as Bifunctional Catalysts for Ring-Opening Polymerization of Lactide and Copolymerization of Carbon Dioxide with Cyclohexene Oxide," Organometallics, 2014, vol, 33, pp. 7091-7100.

Tshuva et al., "[ONXO]-Type Amine Bis(phenolate) Zirconium and Hafnium Complexes as Extremely Active 1-Hexene Polymerization Catalysts," Organometallics, 2002, vol. 21, pp. 662-670.

Valente et al., "Coordinative Chain Transfer Polymerization" Chemical Reviews, 2013, vol. 113, pp. 3836-3857.

U.S. Appl. No. 62/332,940, filed May 6, 2016 Holtcamp et al.
PCT/US2017/055131 filed Oct. 4, 2017 Hule et al.
U.S. Appl. No. 62/410,173, filed Oct. 19, 2016 Hule et al.

* cited by examiner

ASYMMETRIC FLUORENYL-SUBSTITUTED SALAN CATALYSTS

This invention claims priority to and the benefit of U.S. Ser. No. 62/236,701, filed Oct. 2, 2015, which is incorporated by reference herein.

FIELD OF THE INVENTION

This invention relates to asymmetric fluorenyl-substituted Salan catalysts, processes utilizing such catalysts, and polymers produced thereby.

BACKGROUND OF THE INVENTION

Olefin polymerization catalysts are of great use in industry. Hence, there is interest in finding new catalyst systems that increase the commercial usefulness of the catalyst and allow the production of polymers having improved properties.

There is a need in the art for new and improved catalysts and catalyst systems to obtain new and improved polyolefins, polymerization processes, and the like. Accordingly, there is a need in the art for new and improved catalyst systems for the polymerization of olefins, in order to achieve target polymer properties, such as enhanced molecular weight and/or comonomer incorporation, and/or enhanced excellent melting points with improved activity, and the like, that are suitable for commercial applications.

SUMMARY OF THE INVENTION

The instant disclosure is directed to asymmetric fluorenyl-substituted catalyst compounds, and catalyst systems comprising such compounds, processes for the preparation of the catalyst compounds and systems, and processes for the polymerization of olefins using such catalyst compounds and systems.

Thus, in one aspect, embodiments of the invention relate to catalyst compounds represented by Formula I:

Formula I

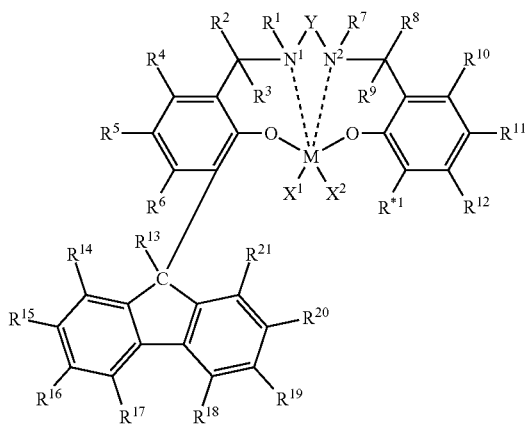

wherein each solid line represents a covalent bond and each dotted line represents a bond having a varying degree of covalency and a varying degree of coordination;

wherein M is a Group 3, 4, 5, or 6 transition metal;
$N^1$ and $N^2$ are nitrogen;
O is oxygen;
each of $X^1$ and $X^2$ is, independently, a univalent $C_1$ to $C_{20}$ hydrocarbyl radical, which may be substituted or unsubstituted, or $X^1$ and $X^2$ join together to form a $C_4$ to $C_{62}$ cyclic or polycyclic ring structure, provided, however, when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{*1}$ may, independently, join together to form a hydrogen, a $C_1$ to $C_{40}$ hydrocarbyl radical, a functional group comprising elements from Groups 13 to 17 of the periodic table of the elements;
optionally, wherein two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{*1}$ may, independently, join together to form a $C_4$ to $C_{62}$ cyclic or polycyclic ring structure, or a combination thereof;
provided that $R^{*1}$ comprises a group other than a substituted or unsubstituted fluorenyl group; and
wherein Y is a $C_1$ to $C_{40}$ divalent hydrocarbyl radical comprising a linker backbone comprising from 1 to 18 carbon atoms bridging between nitrogen atoms $N^1$ and $N^2$.

In another aspect, embodiments of the invention relate to catalyst systems comprising the reaction product of such a catalyst compound and an activator.

In another aspect, embodiments of the invention relate to polymerization processes comprising: contacting one or more olefins with a catalyst system described herein at a temperature, a pressure, and for a period of time sufficient to produce a polyolefin.

In yet another aspect, embodiments of the invention relate to polyolefins comprising ethylene, wherein the polyolefin is produced by a process comprising: contacting ethylene and optionally, one or more $C_3^+$ olefins with a catalyst system described herein at a temperature, a pressure, and for a period of time sufficient to produce a polyolefin.

DETAILED DESCRIPTION OF THE INVENTION

Figure 1A:
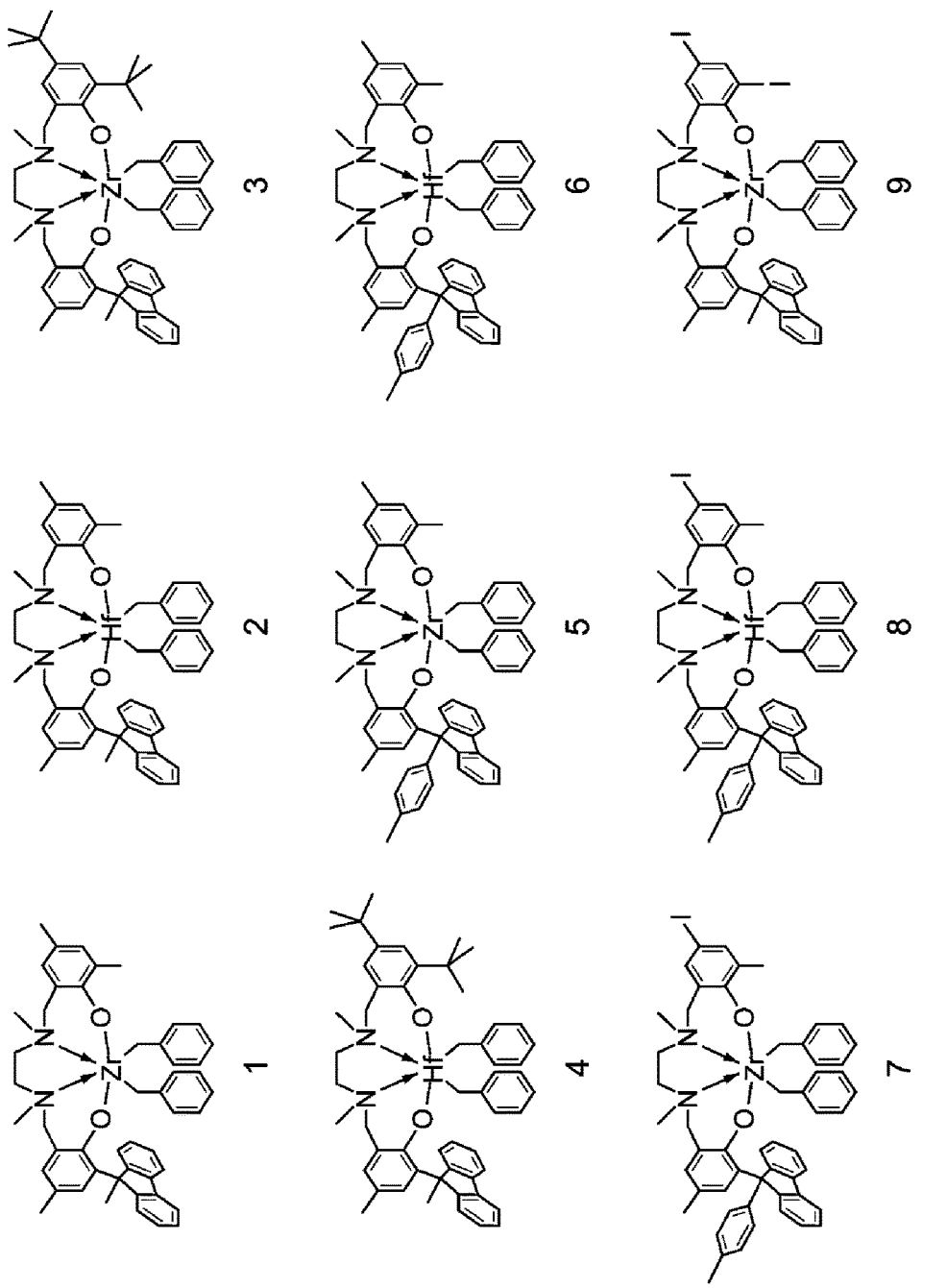
FIG. 1A illustrates exemplary catalysts 1 through 9, according to embodiments of the invention.

In the structures depicted throughout this specification and the claims, a solid line indicates a bond, a dashed line represents a coordinative link between the atoms.

As used herein, the numbering scheme for the Periodic Table groups is the new notation as set out in Chemical and Engineering News, 63(5), 27, (1985).

The terms "hydrocarbyl radical," "hydrocarbyl" and "hydrocarbyl group" are used interchangeably throughout this document unless otherwise specified. For purposes of this disclosure, hydrocarbyl radicals are defined to be $C_1$ to $C_{70}$ radicals, or $C_1$ to $C_{20}$ radicals, or $C_1$ to $C_{10}$ radicals, or $C_6$ to $C_{70}$ radicals, or $C_6$ to $C_{20}$ radicals, or $C_7$ to $C_{20}$ radicals that may be linear, branched, or cyclic and aromatic or non-aromatic.

For the purposes of this invention and the claims thereto, the new numbering scheme for the Periodic Table Groups is used as in Chem. Eng. News, 1985, 63, 27. Therefore, a "Group 4 metal" is an element from Group 4 of the Periodic Table.

The term "substituted" means that a hydrogen atom or a carbon atom, of a hydrocarbyl radical has been replaced by a heteroatom, or a heteroatom-containing group. For purposes herein, a heteroatom is defined as any atom other than carbon and hydrogen. Thus, methyl cyclopentadiene (Cp) is a Cp group wherein one hydrogen has been replaced with a methyl radical, which may also be referred to as a methyl functional group; ethyl alcohol is an ethyl group, wherein one of the H atoms has been replaced with the heteroatom-containing group —OH, and pyridine is considered a substituted phenyl group wherein a carbon of the benzene ring has been replaced with a nitrogen atom.

Exemplary hydrocarbyl radicals include methyl, ethyl, ethenyl, and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, triacontyl, propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, heneicosenyl, docosenyl, tricosenyl, tetracosenyl, pentacosenyl, hexacosenyl, heptacosenyl, octacosenyl, nonacosenyl, triacontenyl, propynyl, butynyl, pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, heneicosynyl, docosynyl, tricosynyl, tetracosynyl, pentacosynyl, hexacosynyl, heptacosynyl, octacosynyl, nonacosynyl, and triacontynyl.

The term "aryl," "aryl radical," and/or "aryl group" refers to aromatic cyclic structures. An aralkyl group is defined to be a aryl group having at least one hydrogen atom replaced by an alkyl group, (such as, a $C_1$ to $C_{40}$ alkyl). Examples of aryl and aralkyl radicals include, but are not limited to: acenaphthenyl, acenaphthylenyl, acridinyl, anthracenyl, benzanthracenyls, benzimidazolyl, benzisoxazolyl, benzofluoranthenyls, benzofuranyl, benzoperylenyls, benzopyrenyls, benzothiazolyl, benzothiophenyls, benzoxazolyl, benzyl, carbazolyl, carbolinyl, chrysenyl, cinnolinyl, coronenyl, cyclohexyl, cyclohexenyl, methylcyclohexyl, dibenzoanthracenyls, fluoranthenyl, fluorenyl, furanyl, imidazolyl, indazolyl, indenopyrenyls, indolyl, indolinyl, isobenzofuranyl, isoindolyl, isoquinolinyl, isoxazolyl, methyl benzyl, methylphenyl, naphthyl, oxazolyl, phenanthrenyl, phenyl, pentamethylphenyl, trimethylphenyl, e.g., 2,4,6-trimethylphenyl, purinyl, pyrazinyl, pyrazolyl, pyrenyl, pyridazinyl, pyridinyl, pyrimidinyl, pyrrolyl, quinazolinyl, quinolonyl, quinoxalinyl, thiazolyl, thiophenyl, and the like.

Alkyl, alkenyl, and alkynyl radicals listed include all isomers including where appropriate cyclic isomers, for example, butyl includes n-butyl, 2-methylpropyl, 1-methylpropyl, tert-butyl, and cyclobutyl (and analogous substituted cyclopropyls); pentyl includes n-pentyl, cyclopentyl, 1-methylbutyl, 2-methylbutyl, 3-methylbutyl, 1-ethylpropyl, and neopentyl (and analogous substituted cyclobutyls and cyclopropyls); and butenyl includes E and Z forms of 1-butenyl, 2-butenyl, 3-butenyl, 1-methyl-1-propenyl, 1-methyl-2-propenyl, 2-methyl-1-propenyl, and 2-methyl-2-propenyl (and cyclobutenyls and cyclopropenyls). Cyclic compounds having substitutions include all isomer forms, for example, methylphenyl would include ortho-methylphenyl, meta-methylphenyl and para-methylphenyl; dimethylphenyl would include 2,3-dimethylphenyl, 2,4-dimethylphenyl, 2,5-dimethylphenyl, 2,6-diphenylmethyl, 3,4-dimethylphenyl, and 3,5-dimethylphenyl.

For purposes herein, a carbazole radical, a hydrocarbyl radical, is represented by the formula:

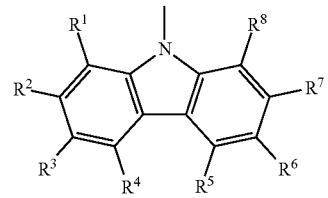

wherein each $R^1$ through $R^8$ is, independently, a hydrogen, a $C_1$ to $C_{40}$ hydrocarbyl radical, a functional group comprising elements from Group 13 to 17 of the periodic table of the elements, or two or more of $R^1$ to $R^8$ may independently join together to form a $C_4$ to $C_{62}$ cyclic or polycyclic ring structure, or a combination thereof. A substituted carbazole is one where at least one of $R^1$ to $R^8$ is not H.

A fluorenyl radical, another hydrocarbyl radical, is represented by the formula:

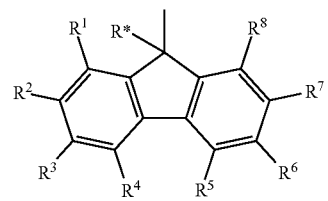

wherein each $R^1$ through $R^8$ is, independently, a hydrogen, a $C_1$ to $C_{40}$ hydrocarbyl radical, a functional group comprising elements from Group 13 to 17 of the periodic table of the elements, or two or more of $R^1$ to $R^8$ may independently join together to form a $C_4$ to $C_{62}$ cyclic or polycyclic ring structure, or a combination thereof; $R^*$ is a hydrogen, a $C_1$ to $C_{40}$ hydrocarbyl radical, a substituted $C_1$ to $C_{40}$ hydrocarbyl radical (particularly $R^*$ may be methyl, phenyl, tolyl, substituted phenyl, or substituted tolyl). A substituted flourenyl is one where at least one of $R^*$, or $R^1$ to $R^8$ is not H.

For purposes herein, an "olefin," alternatively referred to as "alkene," is a linear, branched, or cyclic compound comprising carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

For purposes herein, a "polymer" has two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically. Accordingly, the definition of copolymer, as used herein, includes terpolymers and the like. An oligomer is typically a polymer having a low molecular weight, such an Mn of less than 25,000 g/mol, or in an embodiment less than 2,500 g/mol, or a low number of mer units, such as 75 mer units or less. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

For the purposes of this disclosure, the term "α-olefin" includes $C_2$ to $C_{22}$ olefins having a double bond at the alpha position. Non-limiting examples of α-olefins include ethylene, propylene, 1-butene, 1-pentene, 1-hexene, 1-heptene, 1-octene, 1-nonene, 1-decene, 1-undecene 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene, 1-triacontene, 4-methyl-1-pentene, 3-methyl-1-pentene, 5-methyl-1-nonene, 3,5,5-trimethyl-1-hexene, vinylcyclohexane, and vinylnorbornane.

Non-limiting examples of cyclic olefins and diolefins include cyclopropene, cyclobutene, cyclopentene, cyclohexene, cycloheptene, cyclooctene, cyclononene, cyclodecene, norbornene, 4-methylnorbornene, 2-methylcyclopentene, 4-methylcyclopentene, vinylcyclohexane, norbornadiene, dicyclopentadiene, 5-ethylidene-2-norbornene, vinylcyclohexene, 5-vinyl-2-norbornene, 1,3-divinylcyclopentane, 1,2-divinylcyclohexane, 1,3-divinylcyclohexane, 1,4-divinylcyclohexane, 1,5-divinylcyclooctane, 1-allyl-4-vinylcyclohexane, 1,4-diallylcyclohexane, 1-allyl-5-vinylcyclooctane, and 1,5-diallylcyclooctane.

The terms "catalyst," "catalyst compound," and "transition metal compound" are defined to mean a compound capable of initiating polymerization catalysis under the appropriate conditions. In the description herein, the catalyst may be described as a catalyst precursor, a pre-catalyst compound, a transition metal compound, Salan catalyst, or Salan catalyst compound, and these terms are used interchangeably. A catalyst compound may be used by itself to initiate catalysis or may be used in combination with an activator to initiate catalysis. When the catalyst compound is combined with an activator to initiate catalysis, the catalyst compound is often referred to as a pre-catalyst or catalyst precursor. A "catalyst system" is a combination of at least one catalyst compound, at least one activator, an optional co-activator, and an optional support material, where the system can polymerize monomers to polymer. For the purposes of this invention and the claims thereto, when catalyst systems are described as comprising neutral stable forms of the components it is well understood by one of ordinary skill in the art that the ionic form of the component is the form that reacts with the monomers to produce polymers.

For purposes herein, the term "catalyst productivity" is a measure of how many grams of polymer (P) are produced using a polymerization catalyst comprising W g of catalyst (cat), over a period of time of T hours; and may be expressed by the following formula: P/(T×W) and expressed in units of gP*gcat$^{-1}$*hr$^{-1}$. Conversion is the amount of monomer that is converted to polymer product, and is reported as mol % and is calculated based on the polymer yield and the amount of monomer fed into the reactor. Catalyst activity is a measure of how active the catalyst is and is reported as the mass of product polymer (P) produced per mole of catalyst (cat) used (kg P/mol cat).

An "anionic ligand" is a negatively charged ligand which donates one or more pairs of electrons to a metal ion. A "neutral donor ligand" is a neutrally charged ligand which donates one or more pairs of electrons to a metal ion.

A "scavenger" is a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In an embodiment, a co-activator can be pre-mixed with the catalyst compound to form an alkylated catalyst compound.

As used herein, Mn is number average molecular weight, Mw is weight average molecular weight, and Mz is z average molecular weight, wt % is weight percent, vol % is volume percent, and mol % is mole percent. Molecular weight distribution (MWD) is defined to be Mw divided by Mn. Unless otherwise noted, all molecular weight units, e.g., Mw, Mn, Mz, are g/mol.

For purposes herein a bulky functional group is defined as a functional group having a molecular size greater than or equal to an isopropyl moiety. Accordingly, for purposes herein a bulky functional group includes substituted or unsubstituted bulky aliphatic radicals having three carbons or more, bulky alicyclic radicals having three carbons or more, and/or bulky aromatic radicals having 5 carbons or more, each having a molecular size greater than or equal to an isopropyl moiety.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: $MV=8.3V_s$, where $V_s$ is the scaled volume. $V_s$ is the sum of the relative volumes of the constituent atoms, and is calculated from the molecular formula of the substituent using the following table of relative volumes. For fused rings, the $V_s$ is decreased by 7.5% per fused ring.

| Element | Relative Volume |
| --- | --- |
| H | 1 |
| $1^{st}$ short period, Li to F | 2 |
| $2^{nd}$ short period, Na to Cl | 4 |
| $1^{st}$ long period, K to Br | 5 |
| $2^{nd}$ long period, Rb to I | 7.5 |
| $3^{rd}$ long period, Cs to Bi | 9 |

The following abbreviations may be used through this specification: Me is methyl, Ph is phenyl, Et is ethyl, Pr is propyl, iPr is isopropyl, n-Pr is normal propyl, Bu is butyl, iso-butyl is isobutyl, sec-butyl is a secondary butyl, tert-butyl or t-butyl is a tertiary butyl, n-butyl is normal butyl, pMe is para-methyl, Bz is benzyl, THF (also referred to as thf) is tetrahydrofuran, Mes is mesityl, also known as 1,3,5-trimethylbenzene, Tol is toluene, TMS is trimethylsilyl, TIBAL is triisobutylaluminum, TNOAL is triisobutyl n-octylaluminum, MAO is methylalumoxane, MOMO is methoxymethoxy (also referred to as methoxymethyl ether), Cy is cyclohexyl, and BN is benzyl.

For purposes herein, RT is room temperature, and is defined as 25° C. unless otherwise specified. All percentages are weight percent (wt %) unless otherwise specified.

The term "continuous" means a system that operates without interruption or cessation. For example, a continuous process to produce a polymer would be one where the reactants are continually introduced into one or more reactors and polymer product is continually withdrawn.

Catalyst Compounds

Catalyst compounds suitable in the catalyst system herein typically comprise a transition metal complex represented by the Formula (I):

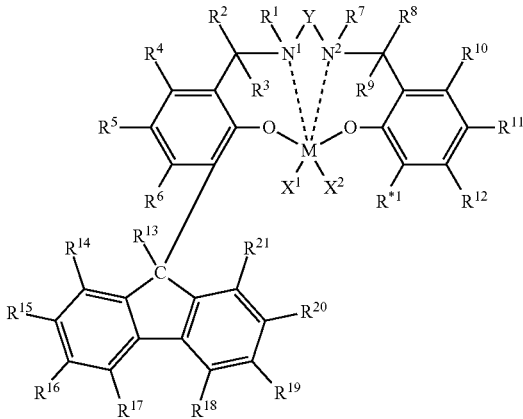

wherein each solid line represents a covalent bond and each dotted line represents a bond having a varying degree of covalency and a varying degree of coordination;
wherein M is a Group 3, 4, 5, or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ may join together to form a $C_4$ to $C_{62}$ cyclic or polycyclic ring structure, provided, however, when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{*1}$ is, independently, hydrogen, a $C_1$ to $C_{40}$ hydrocarbyl radical, a $C_1$ to $C_{40}$ substituted hydrocarbyl radical (such as a functional group comprising elements from Groups 13 to 17 of the periodic table of the elements),
provided that $R^{*1}$ comprises a group other than a substituted or unsubstituted fluorenyl group; and
wherein Y is a $C_1$ to $C_{40}$ divalent hydrocarbyl radical comprising a linker backbone comprising from 1 to 18 carbon atoms bridging between nitrogen atoms $N^1$ and $N^2$.

Optionally, in Formula (I) two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ may independently join together to form a $C_4$ to $C_{62}$ cyclic or polycyclic ring structure, or a combination thereof.

In any embodiment of Formula (I), $R^{*1}$ may be a substituted or unsubstituted $C_1$ to $C_{20}$, hydrocarbyl radical, e.g., methyl, ethyl, ethenyl and isomers of: propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, etc. In particular embodiments, $R^{*1}$ may be a $C_1$ to $C_{10}$ alkyl radical, such as methyl, ethyl, ethenyl and isomers of: propyl, butyl, pentyl, hexyl, heptyl, octyl, nonyl, and decyl.

In any embodiment, $R^{*1}$ may be a substituted or unsubstituted $C_4$ to $C_{20}$ alicyclic radical, e.g., a substituted or unsubstituted cyclobutenyl radical, a substituted or unsubstituted cyclopentyl radical, a substituted or unsubstituted cyclohexyl radical, etc.

In any embodiment, $R^{*1}$ may comprise an electron withdrawing functional group, $-NO_2$, $-CF_3$, $-CCl_3$, $-CBr_3$, $-Cl_3$, $-CN$, $-NCR_\alpha$, $-SO_3H$, $-COOH$, $-CHO$, $-F$, $-Cl$, $-Br$, $-I$, $-COOR_\alpha$, $-COR_\alpha$, $-NR_\alpha^{3+}$, wherein each $R_\alpha$ is independently hydrogen, a $C_1$ to $C_{20}$ alkyl radical, or the like. In some such embodiments, $R^{*1}$ comprises a Group 17 element, e.g., $-F$, $-Cl$, $-Br$, $-I$, particularly $-I$.

In other embodiments, $R^{*1}$ may comprise a substituted or unsubstituted $C_5$ to $C_{40}$ aryl radical. Useful aryl groups comprise aryl groups derived from phenyl, cyclopentadienyl, pyrrole, and alkylamine radicals. For example, in any embodiment, $R^{*1}$ may comprise a substituted or unsubstituted cyclopentadienyl radical represented by Formula (II):

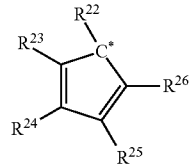

wherein C* indicates an attachment carbon of the radical;
each of $R^{22}$, $R^{23}$, $R^{24}$, $R^{25}$, and $R^{26}$ is, independently, hydrogen, a $C_1$ to $C_{40}$ hydrocarbyl radical, a functional group comprising elements from Groups 13 to 17 of the periodic table of the elements. In particular embodiments, at least 1, 2, 3, or 4 of $R^{22}$, $R^{23}$, $R^{24}$, $R^{25}$, and $R^{26}$ is hydrogen and those of $R^{22}$, $R^{23}$, $R^{24}$, $R^{25}$, and $R^{26}$ that are not hydrogen, independently comprise a $C_1$ to $C_{40}$ hydrocarbyl radical, particularly a $C_1$ to $C_{10}$ alkyl radical, e.g., methyl, ethyl, n-propyl, i-propyl, n-butyl, sec-butyl, i-butyl, t-butyl, etc., or a functional group comprising elements from Groups 13 to 17 of the periodic table of the elements, particularly $-F$, $-Cl$, $-Br$, or $-I$. In some embodiments, each of $R^{22}$, $R^{23}$, $R^{24}$, $R^{25}$, and $R^{26}$ is hydrogen.

Optionally, two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, and $R^{26}$ independently optionally join together to form a $C_4$ to $C_{62}$ cyclic or polycyclic ring structure, or a combination thereof, e.g., a substituted or unsubstituted phenyl ring.

In some such embodiments, the catalyst compound is represented by Formula (III):

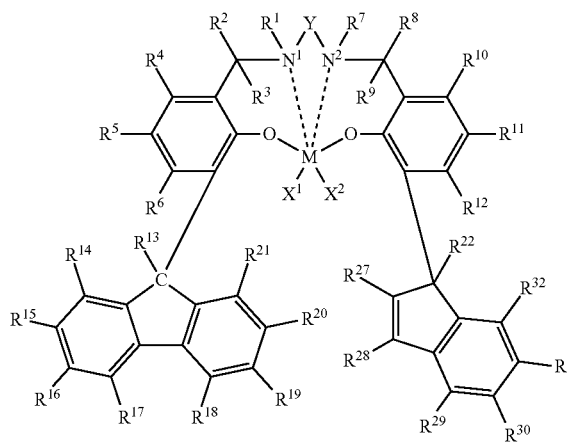

(III)

wherein each $R^{22}$, $R^{27}$, $R^{28}$, $R^{29}$, $R^{30}$, $R^{31}$, and $R^{32}$ is, independently, hydrogen, a $C_1$ to $C_{40}$ hydrocarbyl radical, a substituted $C_1$ to $C_{40}$ hydrocarbyl radical (such as, a functional group comprising elements from Groups 13 to 17 of the periodic table of the elements), and $R^1$ to $R^{21}$, $N^1$, $N^2$, O, M, $X^1$, $X^2$, and Y are as defined for Formula (I). In particular embodiments, at least 1, 2, or 3 of $R^{29}$, $R^{30}$, $R^{31}$, and $R^{32}$ are hydrogen and those of $R^{29}$, $R^{30}$, $R^{31}$, and $R^{32}$ that are not hydrogen, independently comprise a $C_1$ to $C_{40}$ hydrocarbyl radical, particularly a $C_1$ to $C_{10}$ alkyl radical, e.g., methyl, ethyl, n-propyl, i-propyl, n-butyl, sec-butyl, i-butyl, t-butyl, etc., or a functional group comprising elements from Groups 13 to 17 of the periodic table of the elements, particularly —F, —Cl, —Br, or —I. In some embodiments, each of $R^{29}$, $R^{30}$, $R^{31}$, and $R^{32}$ is hydrogen.

Optionally, two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{27}$, $R^{28}$, $R^{29}$, $R^{30}$, $R^{31}$, and $R^{32}$ may, independently, join together to form a $C_4$ to $C_{62}$ cyclic or polycyclic ring structure, or a combination thereof. Provided, however, that $R^{27}$ and $R^{28}$ do not join together to form a substituted or unsubstituted benzene ring.

In some embodiments, $R^{*1}$ comprises a substituted or unsubstituted pyrrole radical represented by Formula (IV):

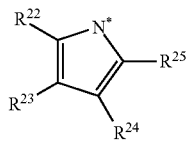

(IV)

wherein N* indicates an attachment nitrogen of the radical; and each of $R^{22}$, $R^{23}$, $R^{24}$, and $R^{25}$ is, independently, hydrogen, a $C_1$ to $C_{40}$ hydrocarbyl radical, a functional group comprising elements from Groups 13 to 17 of the periodic table of the elements. In particular embodiments, at least 1, 2, or 3 of $R^{22}$, $R^{23}$, $R^{24}$, and $R^{25}$ are hydrogen and those of $R^{22}$, $R^{23}$, $R^{24}$, and $R^{25}$ that are not hydrogen, independently comprise a $C_1$ to $C_{40}$ hydrocarbyl radical, particularly a $C_1$ to $C_{10}$ alkyl radical, e.g., methyl, ethyl, n-propyl, i-propyl, n-butyl, sec-butyl, i-butyl, t-butyl, etc., or a functional group comprising elements from Groups 13 to 17 of the periodic table of the elements, particularly —F, —Cl, —Br, or —I. In some embodiments, each of $R^{22}$, $R^{23}$, $R^{24}$, and $R^{25}$ is hydrogen.

Optionally, two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, and $R^{25}$ may independently join together to form a $C_4$ to $C_{62}$ cyclic or polycyclic ring structure, or a combination thereof.

In some embodiments, the catalyst compound according to Formula (III) is represented by Formula (IV):

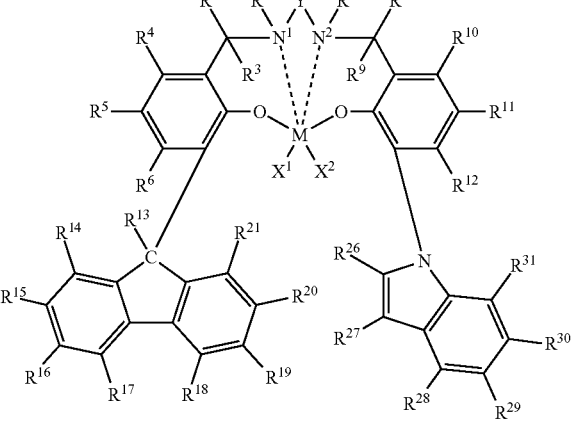

(IV)

In Formula (IV), N is nitrogen, each $R^{26}$, $R^{27}$, $R^{28}$, $R^{29}$, $R^{30}$, and $R^{31}$ is, independently, hydrogen, a $C_1$ to $C_{40}$ hydrocarbyl radical, a substituted $C_1$ to $C_{40}$ hydrocarbyl radical (such as, a functional group comprising elements from Groups 13 to 17 of the periodic table of the elements), and $R^1$ to $R^{21}$, $N^1$, $N^2$, O, M, $X^1$, $X^2$, and Y are as defined for Formula (I). In particular embodiments, at least 1, 2, 3, 4, or 5 of $R^{26}$, $R^{27}$, $R^{28}$, $R^{29}$, $R^{30}$, and $R^{31}$ are hydrogen and those of $R^{26}$, $R^{27}$, $R^{28}$, $R^{29}$, $R^{30}$, and $R^{31}$ that are not hydrogen, independently comprise a $C_1$ to $C_{40}$ hydrocarbyl radical, particularly a $C_1$ to $C_{10}$ alkyl radical, e.g., methyl, ethyl, n-propyl, i-propyl, n-butyl, sec-butyl, i-butyl, t-butyl, etc., or a functional group comprising elements from Groups 13 to 17 of the periodic table of the elements, particularly —F, —Cl, —Br, or —I. In some embodiments, each of $R^{26}$, $R^{27}$, $R^{28}$, $R^{29}$, $R^{30}$, and $R^{31}$ is hydrogen.

Optionally, two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{26}$, $R^{27}$, $R^{28}$, $R^{29}$, $R^{30}$, and $R^{31}$ may independently join together to form a $C_4$ to $C_{62}$ cyclic or polycyclic ring structure, or a combination thereof.

In still other embodiments, the catalyst compound according to Formula (III) is represented by Formula (V):

(V)

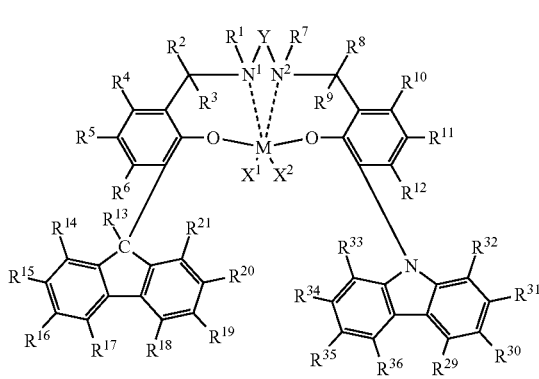

In Formula (V), N is nitrogen, each $R^{29}$, $R^{30}$, $R^{31}$, $R^{32}$, $R^{33}$, $R^{34}$, $R^{35}$, and $R^{36}$ is, independently, hydrogen, a $C_1$ to $C_{40}$ hydrocarbyl radical, a a substituted $C_1$ to $C_{40}$ hydrocarbyl radical (such as, a functional group comprising elements from Groups 13 to 17 of the periodic table of the elements), and $R^1$ to $R^{21}$, M, $N^1$, $N^2$, O, Y, $X^1$ and $X^2$ are as defined for Formula (I). In particular embodiments, at least 1, 2, 3, 4, 5, 6, or 7 of $R^{29}$, $R^{30}$, $R^{31}$, $R^{32}$, $R^{33}$, $R^{34}$, $R^{35}$, and $R^{36}$ are hydrogen and those of $R^{29}$, $R^{30}$, $R^{31}$, $R^{32}$, $R^{33}$, $R^{34}$, $R^{35}$, and $R^{36}$ that are not hydrogen, independently comprise a $C_1$ to $C_{40}$ hydrocarbyl radical, particularly a $C_1$ to $C_{10}$ alkyl radical, e.g., methyl, ethyl, n-propyl, i-propyl, n-butyl, sec-butyl, i-butyl, t-butyl, etc., or a functional group comprising elements from Groups 13 to 17 of the periodic table of the elements, particularly —F, —Cl, —Br, or —I. In some embodiments, each of $R^{29}$, $R^{30}$, $R^{31}$, $R^{32}$, $R^{33}$, $R^{34}$, $R^{35}$, and $R^{36}$ are hydrogen.

Optionally, two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{29}$, $R^{30}$, $R^{31}$, $R^{32}$, $R^{33}$, $R^{34}$, $R^{35}$, and $R^{36}$ may independently join together to form a $C_4$ to $C_{62}$ cyclic or polycyclic ring structure, or a combination thereof.

In other embodiments, catalyst compounds according the invention may have a structure according to Formula (VI):

(VI)

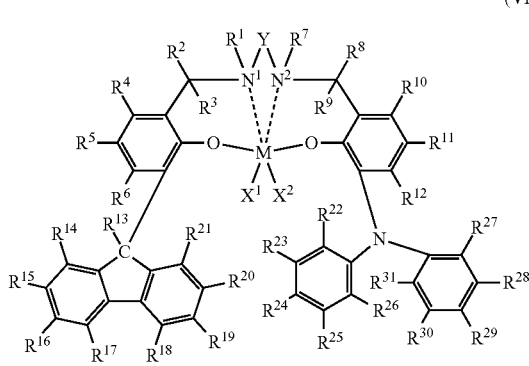

In Formula (VI), N is nitrogen, each $R^{22}$, $R^{23}$, $R^{24}$, $R^{25}$, $R^{26}$, $R^{27}$, $R^{28}$, $R^{29}$, $R^{30}$, and $R^{31}$ is, independently, hydrogen, a $C_1$ to $C_{40}$ hydrocarbyl radical, a substituted $C_1$ to $C_{40}$ hydrocarbyl radical (such as, a functional group comprising elements from Groups 13 to 17 of the periodic table of the elements). In particular embodiments, at least 1, 2, 3, 4, 5, 6, 7, 8, or 9 of $R^{22}$, $R^{23}$, $R^{24}$, $R^{25}$, $R^{26}$, $R^{27}$, $R^{28}$, $R^{29}$, $R^{30}$, and $R^{31}$ are hydrogen and those of $R^{22}$, $R^{23}$, $R^{24}$, $R^{25}$, $R^{26}$, $R^{27}$, $R^{28}$, $R^{29}$, $R^{30}$, and $R^{31}$ that are not hydrogen, independently comprise a $C_1$ to $C_{40}$ hydrocarbyl radical, particularly a $C_1$ to $C_{10}$ alkyl radical, e.g., methyl, ethyl, n-propyl, i-propyl, n-butyl, sec-butyl, i-butyl, t-butyl, etc., or a functional group comprising elements from Groups 13 to 17 of the periodic table of the elements, particularly —F, —Cl, —Br, or —I. In some embodiments, each of $R^{22}$, $R^{23}$, $R^{24}$, $R^{25}$, $R^{26}$, $R^{27}$, $R^{28}$, $R^{29}$, $R^{30}$, and $R^{31}$ is hydrogen.

Optionally, two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ may independently join together to form a $C_4$ to $C_{62}$ cyclic or polycyclic ring structure, or a combination thereof.

In still other embodiments, catalyst compounds may have a structure according to the Formula (VII):

(VII)

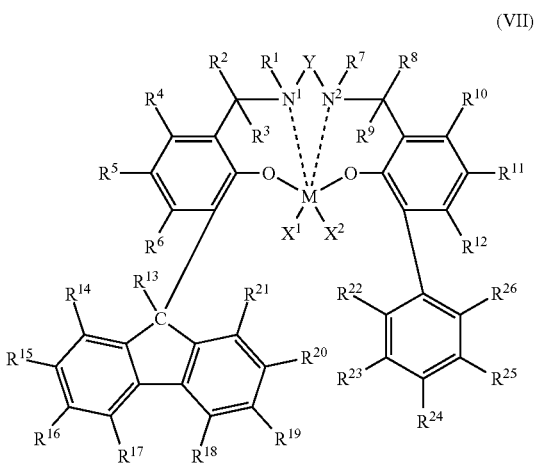

In Formula (VII), each $R^{22}$, $R^{23}$, $R^{24}$, $R^{25}$, and $R^{26}$ is, independently, hydrogen, a $C_1$ to $C_{40}$ hydrocarbyl radical, a substituted $C_1$ to $C_{40}$ hydrocarbyl radical (such as a functional group comprising elements from Groups 13 to 17 of the periodic table of the elements), and $R^1$-$R^{21}$, M, Y, O, $N^1$, $N^2$, $X^1$, and $X^2$ are as defined for Formula (I). In particular embodiments, at least 1, 2, 3, or 4 of $R^{22}$, $R^{23}$, $R^{24}$, $R^{25}$, and $R^{26}$ are hydrogen and those of $R^{22}$, $R^{23}$, $R^{24}$, $R^{25}$, and $R^{26}$ that are not hydrogen, independently comprise a $C_1$ to $C_{40}$ hydrocarbyl radical, particularly a $C_1$ to $C_{10}$ alkyl radical, e.g., methyl, ethyl, n-propyl, i-propyl, n-butyl, sec-butyl, i-butyl, t-butyl, etc., or a functional group comprising elements from Groups 13 to 17 of the periodic table of the elements, particularly —F, —Cl, —Br, or —I. In some embodiments, each of $R^{22}$, $R^{23}$, $R^{24}$, $R^{25}$, and $R^{26}$ is hydrogen.

Optionally, two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, and $R^{26}$ may independently join together to form a $C_4$ to $C_{62}$ cyclic or polycyclic ring structure, or a combination thereof. In particular embodiments, $R^{22}$ and $R^{23}$ may form a substituted or unsubstituted benzene ring. Additionally or alternatively, $R^{24}$ and $R^{25}$ and/or $R^{25}$ and $R^{26}$ may join together to form a substituted or unsubstituted benzene ring.

In any embodiment according to Formulas (I)-(VII), $R^5$ may comprise a $C_1$ to $C_{10}$ alkyl radical, e.g., methyl, ethyl, n-propyl, i-propyl, n-butyl, sec-butyl, i-butyl, t-butyl, $C_1$ to $C_{10}$ alkoxy, methoxy, ethoxy, n-propoxy, i-propoxy, n-butoxy, sec-butoxy, i-butoxy, t-butoxy, and each of $R^1$, $R^2$, $R^3$, $R^4$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{*1}$ is, independently, hydrogen, halogen, or a $C_1$ to $C_{10}$ hydrocarbyl.

In any embodiment according to Formulas (I)-(VII), $R^{11}$ may comprise a $C_1$ to $C_{10}$ alkyl radical, e.g., methyl, ethyl, n-propyl, i-propyl, n-butyl, sec-butyl, i-butyl, t-butyl, $C_1$ to $C_{10}$ alkoxy, methoxy, ethoxy, n-propoxy, i-propoxy, n-butoxy, sec-butoxy, i-butoxy, t-butoxy, and each of $R^1$, $R^2$, $R^3$, $R^4$, $R^5$, $R^6$, $R^7$, $R^8$, $R^9$, $R^{10}$, $R^{12}$, $R^{13}$, $R^{14}$, $R^{15}$, $R^{16}$, $R^{17}$, $R^{18}$, $R^{19}$, $R^{20}$, $R^{21}$, and $R^{*1}$ is, independently, hydrogen, halogen, or a $C_1$ to $C_{10}$ hydrocarbyl.

In any embodiment of Formulas (I) to (VII), $R^{13}$ is selected from the group consisting of $C_1$ to $C_{10}$ alkyl, e.g., methyl, ethyl, n-propyl, i-propyl, n-butyl, sec-butyl, i-butyl, t-butyl, etc., $C_1$ to $C_{10}$ alkoxy radical, methoxy, ethoxy, n-propoxy, i-propoxy, n-butoxy, sec-butoxy, i-butoxy, t-butoxy, etc., $C_1$ to $C_{10}$ alkoxy, e.g., methoxy, ethoxy, n-propoxy, i-propoxy, n-butoxy, sec-butoxy, i-butoxy, t-butoxy, pentoxy, hexoxy, heptoxy, octoxy, nonoxy, decoxy, and isomers thereof, and $C_6$-$C_{15}$ aryl, e.g., substituted and unsubstituted phenyl, benzyl, 4-methyl-1-phenyl, etc. In particular embodiments, $R^{13}$, is selected from methyl and 4-methyl-1-phenyl.

In other embodiments, at least one of $R^5$ and/or $R^{11}$ comprises an electron withdrawing functional group e.g., —$NO_2$, —$CF_3$, —$CCl_3$, —$CBr_3$, —$Cl_3$, —CN, —$NCR^\alpha$, —$SO_3H$, —COOH, —CHO, —F, —Cl, —Br, —I, —$COOR^\alpha$, —$COR^\alpha$, and —$NR^\alpha_3{}^+$, wherein each $R^\alpha$ is independently hydrogen, a $C_1$ to $C_{20}$ alkyl radical, or the like.

In some embodiments, each of $R^5$ and $R^{11}$ is independently selected from the group consisting of $C_1$ to $C_{10}$ alkyl, e.g., methyl, ethyl, n-propyl, i-propyl, n-butyl, sec-butyl, i-butyl, t-butyl, pentyl, hexyl, septyl, octyl, nonyl, decyl, and isomers thereof etc., $C_1$ to $C_{10}$ alkoxy, e.g., methoxy, ethoxy, n-propoxy, i-propoxy, n-butoxy, sec-butoxy, i-butoxy, t-butoxy, etc., and $C_6$ to $C_{15}$ aryl, e.g., phenyl, benzyl, etc. In particular embodiments, $R^5$ and $R^{11}$ are each methyl. In other embodiments, $R^5$ is methyl and $R^{11}$ is methyl, t-butyl or —I. In some such embodiments, $R^{13}$ may be methyl or 4-methyl-1-phenyl. Additionally or alternatively, $R_{*1}$ may be methyl, t-butyl or —I.

In any embodiment, the transition metal, M, may be particularly Ti, Zr, or Hf, more particularly Zr or HF, and mixtures thereof.

In any of the embodiments of Formulas (I) to (VII), each of $X^1$ and $X^2$ is, independently, a halogen or a $C_1$ to $C_7$ hydrocarbyl radical, e.g., methyl, ethyl, propyl, methyl, ethyl, n-propyl, i-propyl, n-butyl, sec-butyl, i-butyl, t-butyl, pentyl, hexyl, septyl, 4-methyl-1-pentyl, and isomers thereof etc. In other embodiments, at least one of $X^1$ and $X^2$ is a substituted or unsubstituted benzyl radical.

In any embodiment of Formulas (I) to (VII), Y may be a $C_1$ to $C_{40}$ divalent hydrocarbyl radical comprising O, S, S(O), S(O)$_2$, Si(R')$_2$, P(R'), N, N(R'), or a combination thereof, wherein each R' is independently a $C_1$ to $C_{18}$ hydrocarbyl radical. In other embodiments, Y may be a divalent $C_1$ to $C_{20}$ hydrocarbyl radical, e.g., —$CH_2CH_2$ $CH_2$— or 1,2-cyclohexylene. In particular embodiments, Y is —$CH_2CH_2$—.

In specific embodiments, catalyst compounds according to Formulas (I) to (VIII) may have one or more of the following features: M is Zr or Hf; $X^1$ and $X^2$ are benzyl radicals; $R^5$ and $R^{11}$ are independently a methyl or t-butyl or —I; $R^{13}$ comprises a $C_1$ to $C_{10}$ alkyl, e.g., methyl, or 4-methylphenyl radical; $R^1$, $R^2$, $R^3$ $R^4$, $R^6$, $R^7$, $R^9$, $R^{10}$, $R^{11}$, $R^{12}$, $R^{14}$, $R^{15}$, $R^{16}$, $R^{17}$, $R^{18}$, $R^{19}$, $R^{20}$, and $R^{21}$ are hydrogen; and Y is —$CH_2CH_2$—.

Methods to Prepare the Catalyst Compounds

Comparative symmetric transition metal compounds may be prepared by two general synthetic routes. The parent Salan ligands are prepared by a one-step Mannich reaction from the parent phenol (Reaction A) or by a two-step imine-condensation/alkylation procedure if the salicylaldehyde is used (Reaction B). The ligand is then converted into the metal dibenzyl catalyst precursor by reaction with the metal tetra-aryl starting material, e.g., tetrabenzyl, to yield the finished complex (Reaction C).

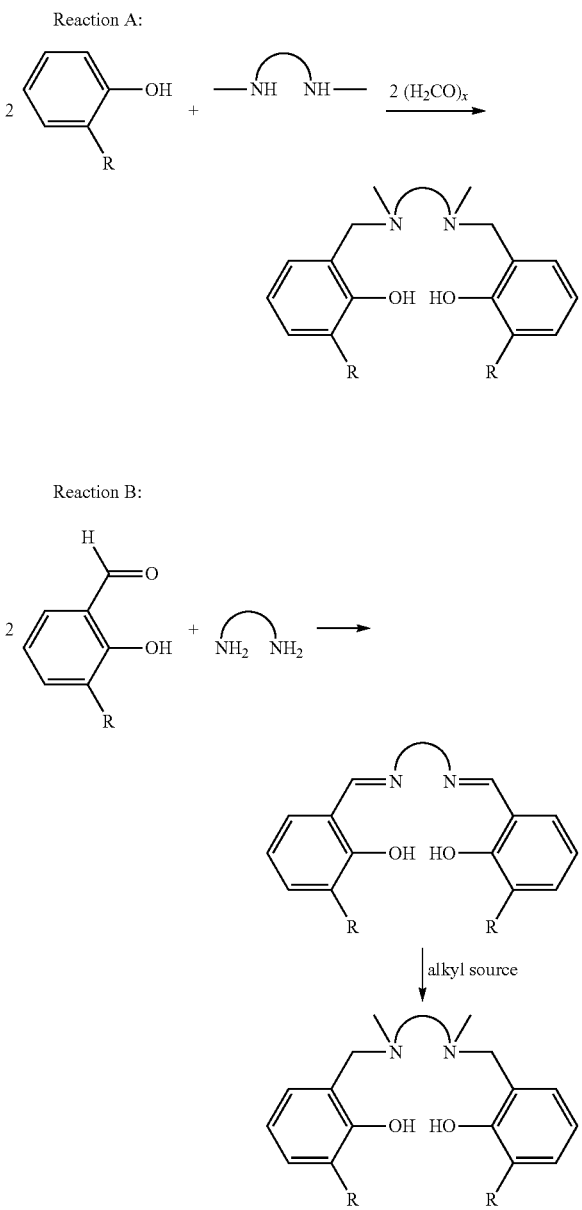

Reaction C:

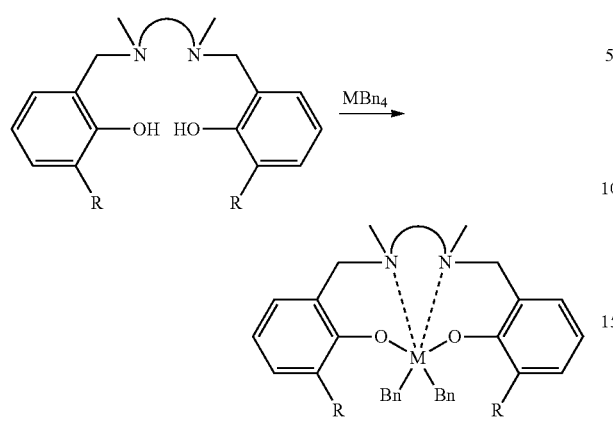

Asymmetric transition metal compounds according to embodiments of the invention may be prepared by a stepwise synthetic route. The parent Salan ligands are prepared by reaction of the salicylaldehyde with the diamine, followed by reduction with NaBH$_4$. The asymmetric ligand is then formed by an HBr elimination reaction with a bromomethylphenol (Reaction D). The ligand is then converted into the metal dibenzyl catalyst precursor by reaction with the metal tetrabenzyl starting material to yield the finished complex (Reaction E).

Reaction D:

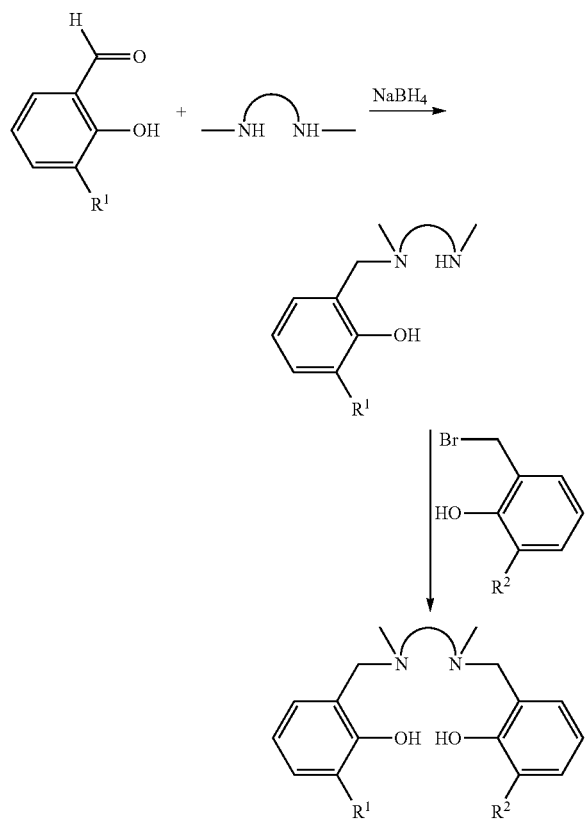

Reaction E:

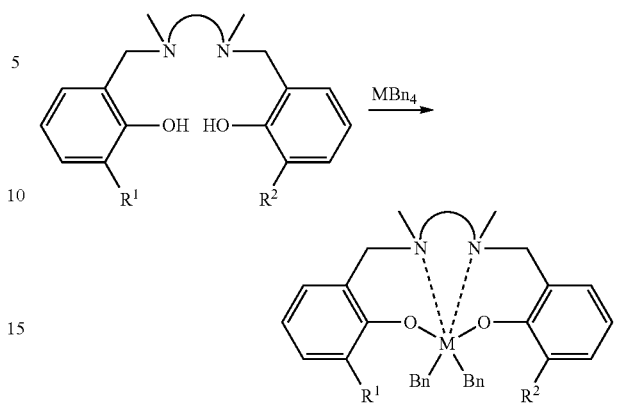

Catalyst Systems

Catalyst systems described herein comprise the reaction product of at least a first catalyst compound and an activator.

Activators

After the complexes described above have been synthesized, catalyst systems may be formed by combining them with activators in any manner known from the literature including by supporting them for use in slurry or gas phase polymerization.

Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal complex cationic and providing a charge-balancing non-coordinating or weakly coordinating anion.

Alumoxane Activators

In one embodiment, alumoxane activators are utilized as an activator in the catalyst system. Alumoxanes are generally oligomeric compounds containing —Al(R$^1$)—O— subunits, where R$^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator, typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. Preferably, alumoxane is present at zero mol %, alternately the alumoxane is present at a molar ratio of aluminum to catalyst compound transition metal less than 500:1, preferably less than 300:1, preferably less than 100:1, preferably less than 1:1.

Non-Coordinating Anion Activators

A non-coordinating anion (NCA) is defined to mean an anion either that does not coordinate to the catalyst metal cation or that does coordinate to the metal cation, but only weakly. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon. A stoichiometric activator can be either neutral or ionic. The terms ionic activator, and stoichiometric ionic activator can be used interchangeably. Likewise, the terms neutral stoichiometric activator, and Lewis acid activator can be used interchangeably. The term non-coordinating anion includes neutral stoichiometric activators, ionic stoichiometric activators, ionic activators, and Lewis acid activators.

"Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

The catalyst systems of this invention can include at least one non-coordinating anion (NCA) activator.

In a preferred embodiment, boron containing NCA activators represented by the formula below can be used:

where: Z is (L-H) or a reducible Lewis acid; L is a neutral Lewis base; H is hydrogen; (L-H) is a Bronsted acid; $A^{d-}$ is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the transition metal catalyst precursor, resulting in a cationic transition metal species.

The activating cation $Z_d^+$ may also be a moiety such as silver, tropylium, carboniums, ferroceniums and mixtures, preferably carboniums and ferroceniums. Most preferably $Z_d^+$ is triphenyl carbonium. Preferred reducible Lewis acids can be any triaryl carbonium (where the aryl can be substituted or unsubstituted, such as those represented by the formula: $(Ar_3C^+)$, where Ar is aryl or aryl substituted with a heteroatom, a $C_1$ to $C_{40}$ hydrocarbyl, or a substituted $C_1$ to $C_{40}$ hydrocarbyl), preferably the reducible Lewis acids in formula (14) above as "Z" include those represented by the formula: $(Ph_3C)$, where Ph is a substituted or unsubstituted phenyl, preferably substituted with $C_1$ to $C_{40}$ hydrocarbyls or substituted a $C_1$ to $C_{40}$ hydrocarbyls, preferably $C_1$ to $C_{20}$ alkyls or aromatics or substituted $C_1$ to $C_{20}$ alkyls or aromatics, preferably Z is a triphenylcarbonium.

When $Z_d^+$ is the activating cation $(L-H)_d^+$, it is preferably a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ wherein k is 1, 2, or 3; n is 1, 2, 3, 4, 5, or 6 (preferably 1, 2, 3, or 4); n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst are the compounds described as (and particularly those specifically listed as) activators in U.S. Pat. No. 8,658,556, which is incorporated herein by reference.

Most preferably, the ionic stoichiometric activator $Z_d^+$ $(A^{d-})$ is one or more of N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3, 5-bis(trifluoromethyl)phenyl)borate, or triphenylcarbenium tetra(perfluorophenyl)borate.

Bulky activators are also useful herein as NCAs. "Bulky activator" as used herein refers to anionic activators represented by the formula:

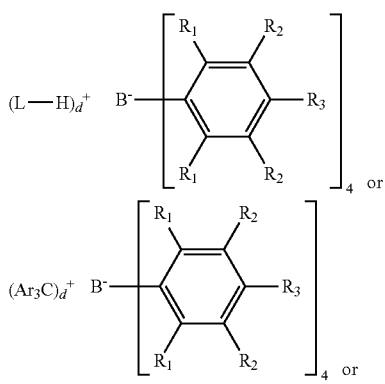

wherein:
each $R_1$ is, independently, a halide, preferably a fluoride;
Ar is substituted or unsubstituted aryl group (preferably a substituted or unsubstituted phenyl), preferably substituted with $C_1$ to $C_{40}$ hydrocarbyls, preferably $C_1$ to $C_{20}$ alkyls or aromatics;
each $R_2$ is, independently, a halide, a $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_2$ is a fluoride or a perfluorinated phenyl group); each $R_3$ is a halide, $C_6$ to $C_{20}$ substituted aromatic hydrocarbyl group or a siloxy group of the formula —O—Si—$R_a$, where $R_a$ is a $C_1$ to $C_{20}$ hydrocarbyl or hydrocarbylsilyl group (preferably $R_3$ is a fluoride or a $C_6$ perfluorinated aromatic hydrocarbyl group); wherein $R_2$ and $R_3$ can form one or more saturated or unsaturated, substituted or unsubstituted rings (preferably $R_2$ and $R_3$ form a perfluorinated phenyl ring);
L is a neutral Lewis base; (L-H)$^+$ is a Bronsted acid; d is 1, 2, or 3;
wherein the anion has a molecular weight of greater than 1020 g/mol; and
wherein at least three of the substituents on the B atom each have a molecular volume of greater than 250 cubic Å, alternately greater than 300 cubic Å, or alternately greater than 500 cubic Å.
Preferably $(Ar_3C)_d^+$ is $(Ph_3C)_d^+$, where Ph is a substituted or unsubstituted phenyl, preferably substituted with $C_1$ to $C_{40}$ hydrocarbyls or substituted $C_1$ to $C_{40}$ hydrocarbyls, preferably $C_1$ to $C_{20}$ alkyls or aromatics or substituted $C_1$ to $C_{20}$ alkyls or aromatics.
Particularly useful bulky activators are described in U.S. Pat. No. 8,658,556, which is incorporated herein by reference.
In another embodiment, one or more of the NCA activators is chosen from the activators described in U.S. Pat. No. 6,211,105.
Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Ph$_3$C$^+$][B(C$_6$F$_5$)$_4$$^-$], [Me$_3$NH$^+$][B(C$_6$F$_5$)$_4$$^-$]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

The typical activator-to-catalyst compound ratio, e.g., all NCA activators-to-catalyst compound ratio is about a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of this invention that the catalyst compounds can be combined with combinations of alumoxanes and NCA's (see for example, U.S. Pat. No. 5,153,157; U.S. Pat. No. 5,453,410; EP 0 573 120; WO 94/07928; and WO 95/14044), which discuss the use of an alumoxane in combination with an ionizing activator).

Scavengers or Co-Activators

In an embodiment, the catalyst system may further include scavengers and/or co-activators. Suitable aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum and the like. Other oxophilic species such as diethyl zinc may be used. In an embodiment, the scavengers and/or co-activators are present at less than 14 wt %, or from 0.1 to 10 wt %, or from 0.5 to 7 wt %, by weight of the catalyst system.

Polymerization Processes

In an embodiment, a polymerization processes includes contacting monomers (such as ethylene and propylene), and optionally comonomers, with a catalyst system comprising an activator and at least one catalyst compound, as described above. In an embodiment, the catalyst compound and activator may be combined in any order, and may be combined prior to contacting with the monomer. In an embodiment, the catalyst compound and/or the activator are combined after contacting with the monomer.

Monomers useful herein include substituted or unsubstituted $C_2$ to $C_{40}$ alpha olefins, or $C_2$ to $C_{20}$ alpha olefins, or $C_2$ to $C_{12}$ alpha olefins, or ethylene, propylene, butene, pentene, hexene, heptene, octene, nonene, decene, undecene, dodecene and isomers thereof. In an embodiment of the invention, the monomer comprises propylene and an optional comonomers comprising one or more ethylene or $C_4$ to $C_{40}$ olefins, or $C_4$ to $C_{20}$ olefins, or $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In an embodiment, the monomer comprises ethylene or ethylene and a comonomer comprising one or more $C_3$ to $C_{40}$ olefins, or $C_4$ to $C_{20}$ olefins, or $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, or hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, or norbornene, norbornadiene, and dicyclopentadiene.

In an embodiment, one or more dienes are present in the polymer produced herein at up to 10 weight %, or at 0.00001 to 1.0 weight %, or 0.002 to 0.5 weight %, or 0.003 to 0.2 weight %, based upon the total weight of the composition. In an embodiment, 500 ppm or less of diene is added to the polymerization, or 400 ppm or less, or 300 ppm or less. In an embodiment, at least 50 ppm of diene is added to the polymerization, or 100 ppm or more, or 150 ppm or more.

Diolefin monomers useful in this invention include any hydrocarbon structure, or $C_4$ to $C_{30}$, having at least two unsaturated bonds, wherein at least two of the unsaturated bonds are readily incorporated into a polymer by either a stereospecific or a non-stereospecific catalyst(s). In an embodiment, the diolefin monomers may be selected from alpha, omega-diene monomers (i.e., di-vinyl monomers). Useful diolefin monomers include linear di-vinyl monomers, preferably, those containing from 4 to 30 carbon atoms. Examples of dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Cyclic dienes include cyclopentadiene, vinylnorbornene, norbornadiene, ethylidene norbornene, divinylbenzene, dicyclopentadiene or higher ring containing diolefins with or without substituents at various ring positions.

In an embodiment, where butene is the comonomer, the butene source may be a mixed butene stream comprising various isomers of butene. The 1-butene monomers are expected to be preferentially consumed by the polymerization process. Use of such mixed butene streams will provide an economic benefit, as these mixed streams are often waste streams from refining processes, for example, $C_4$ raffinate streams, and can therefore be substantially less expensive than pure 1-butene.

Polymerization processes according to the instant disclosure may be carried out in any manner known in the art. Any suspension, homogeneous, bulk, solution, slurry, or gas phase polymerization process known in the art can be used. Such processes can be run in a batch, semi-batch, or continuous mode. Homogeneous polymerization processes and slurry processes are suitable for use herein, wherein a homogeneous polymerization process is defined to be a process where at least 90 wt % of the product is soluble in the reaction media. A bulk homogeneous process is suitable for use herein, wherein a bulk process is defined to be a process where monomer concentration in all feeds to the reactor is 70 vol % or more. In an embodiment, no solvent or diluent is present or added in the reaction medium, (except for the small amounts used as the carrier for the catalyst system or other additives, or amounts typically found with the monomer; e.g., propane in propylene). In an embodiment, the process is a slurry process. As used herein the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkyl substituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In an embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In an embodiment, the solvent is not aromatic, or aromatics are present in the solvent at less than 1 wt %, or less than 0.5 wt %, or less than 0.0 wt % based upon the weight of the solvents.

In an embodiment, the feed concentration of the monomers and comonomers for the polymerization is 60 vol % solvent or less, or 40 vol % or less, or 20 vol % or less, based on the total volume of the feedstream. Or the polymerization is run in a bulk process.

Polymerizations can be run at any temperature and/or pressure suitable to obtain the desired ethylene polymers. Suitable temperatures and/or pressures include a temperature in the range of from about 0° C. to about 300° C., or about 20° C. to about 200° C., or about 35° C. to about 150° C., or about 50° C. to about 150° C., or from about 40° C. to about 120° C., or from about 45° C. to about 80° C.; and at a pressure in the range of from about 0.35 MPa to about 10 MPa, or from about 0.45 MPa to about 6 MPa, or from about 0.5 MPa to about 4 MPa.

In an embodiment, the run time of the reaction is from about 0.1 minutes to about 24 hours, or up to 16 hours, or in the range of from about 5 to 250 minutes, or from about 10 to 120 minutes.

In an embodiment, hydrogen is present in the polymerization reactor at a partial pressure of 0.001 to 50 psig (0.007 to 345 kPa), or from 0.01 to 25 psig (0.07 to 172 kPa), or 0.1 to 10 psig (0.7 to 70 kPa).

In an embodiment, the activity of the catalyst is at least 50 g/mmol/hour, or 500 or more g/mmol/hour, or 5000 or more g/mmol/hr, or 50,000 or more g/mmol/hr. In an alternate embodiment, the conversion of olefin monomer is at least 10%, based upon polymer yield and the weight of the monomer entering the reaction zone, or 20% or more, or 30% or more, or 50% or more, or 80% or more.

In an embodiment, the polymerization conditions include one or more of the following: 1) temperatures of 0 to 300° C. (or 25 to 150° C., or 40 to 120° C., or 45 to 80° C.); 2) a pressure of atmospheric pressure to 10 MPa (or 0.35 to 10 MPa, or from 0.45 to 6 MPa, or from 0.5 to 4 MPa); 3) the presence of an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; or where aromatics are present in the solvent at less than 1 wt %, or less than 0.5 wt %, or at 0 wt % based upon the weight of the solvents); 4) wherein the catalyst system used in the polymerization comprises less than 0.5 mol %, or 0 mol % alumoxane, or the alumoxane is present at a molar ratio of aluminum to transition metal less than 500:1, or less than 300:1, or less than 100:1, or less than 1:1; 5) the polymerization or occurs in one reaction zone; 6) the productivity of the catalyst compound is at least 80,000 g/mmol/hr (or at least 150,000 g/mmol/hr, or at least 200,000 g/mmol/hr, or at least 250,000 g/mmol/hr, or at least 300,000 g/mmol/hr); 7) scavengers (such as trialkyl aluminum compounds) are absent (e.g., present at zero mol %) or the scavenger is present at a molar ratio of scavenger to transition metal of less than 100:1, or less than 50:1, or less than 15:1, or less than 10:1; and/or 8) optionally hydrogen is present in the polymerization reactor at a partial pressure of 0.007 to 345 kPa (0.001 to 50 psig) (or from 0.07 to 172 kPa (0.01 to 25 psig), or 0.7 to 70 kPa (0.1 to 10 psig)).

In an embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In an embodiment, the polymerization occurs in one reaction zone.

Polyolefin Products

The instant disclosure also relates to processes for using the catalyst systems described herein in olefin polymerization.

Thus, the invention relates in part to processes for producing olefin polymers, e.g., polyethylene and polypropylene homopolymers and copolymers, particularly alpha-olefin copolymers. In an embodiment, the polymers produced herein are homopolymers of ethylene or propylene, are copolymers of ethylene or having from 0 to 25 mol % (or from 0.5 to 20 mol %, or from 1 to 15 mol %, or from 3 to 10 mol %) of one or more $C_3$ to $C_{20}$ olefin comonomer (or $C_3$ to $C_{12}$ alpha-olefin, or propylene, butene, hexene, octene, decene, dodecene, or propylene, butene, hexene, octene), or are copolymers of propylene or having from 0 to 25 mol % (or from 0.5 to 20 mol %, or from 1 to 15 mol %, or from 3 to 10 mol %) of one or more of $C_2$ or $C_4$ to $C_{20}$ olefin comonomer (or ethylene or $C_4$ to $C_{12}$ alpha-olefin, or ethylene, butene, hexene, octene, decene, dodecene, or ethylene, butene, hexene, octene).

In an embodiment, the monomer is ethylene and the comonomer is hexene, or from 1 to 15 mol % hexene, or 1 to 10 mol % hexene.

In an embodiment, the polymers produced herein have an Mw of 5,000 to 1,000,000 g/mol (e.g., 25,000 to 750,000 g/mol, or 50,000 to 500,000 g/mol), and/or an Mw/Mn of greater than 1 to 40, or 1.2 to 20, or 1.3 to 10, or 1.4 to 5, or 1.5 to 4, or 1.5 to 3.

In an embodiment, the polymer produced herein has a unimodal or multimodal molecular weight distribution as determined by Gel Permeation Chromotography (GPC). By "unimodal" is meant that the GPC trace has one peak or inflection point. By "multimodal" is meant that the GPC trace has at least two peaks or inflection points. An inflection point is that point where the second derivative of the curve changes in sign (e.g., from negative to positive or vice versa).

In an embodiment, the polymers may be linear in character, which may be determined by elution fractionation, wherein non-linear polymers have a CDBI of less than 45%, whereas linear polyethylene types refer to polyethylene having a CDBI of greater than 50%, the CDBI being determined as described in WO 93/03093 (U.S. Pat. No. 5,206,075). In an embodiment, the polymer produced herein has a composition distribution breadth index (CDBI) of 50% or more, or 60% or more, or 70% or more. CDBI is a measure of the composition distribution of monomer within the polymer chains and is measured by the procedure described in PCT publication WO 93/03093, published Feb. 18, 1993, specifically columns 7 and 8 as well as in Wild et al, J. Poly. Sci., Poly. Phys. Ed., Vol. 20, p. 441 (1982) and U.S. Pat. No. 5,008,204, including that fractions having a weight average molecular weight (Mw) below 15,000 are ignored when determining CDBI.

Polymers with an Mw/Mn of 4.5 or less may include a significant level of long chain branching. The long chain branching is understood to be the result of the incorporation of terminally unsaturated polymer chains (formed by the specific termination reaction mechanism encountered with single site catalysts) into other polymer chains in a manner analogous to monomer incorporation. The branches are hence believed to be linear in structure and may be present at a level where no peaks can be specifically attributed to such long chain branches in the $^{13}C$ NMR spectrum. In an embodiment, the polymers produced according to the instant disclosure comprise a significant amount of long chain branching, defined as having a ratio of long chain branching of at least 7 carbons per 1000 carbon atoms as determined according to the $^{13}C$ NMR spectrum of greater than 0.5. In an embodiment, the ratio of long chain branching with branches having at least 7 carbons, per 1000 carbon atoms as determined according to the $^{13}C$ NMR spectrum is greater than 1, or greater than 1.5, or greater than 2.

Polymers described herein may have one or more of the following features:
a) an Mn of at least 200 g/mol, measured by 1H NMR, or 250 g/mol to 100,000 g/mol, e.g., or 200 g/mol to 75,000 g/mol, e.g., or 200 g/mol to 60,000 g/mol, or 300 g/mol to 60,000 g/mol, or 750 g/mol to 30,000 g/mol); and/or
b) a Tm, as determined by DSC, of 100° C. or more, or 110° C. or more, or 120° C. or more; and/or
c) the polymer comprises at least 50 mol % ethylene, or at least 60 mol %, or at least 70 mol %, or at least 75 mol %, or at least 80 mol %, or at least 85 mol %, or at least 90 mol %, or at least 95 mol %, or essentially 100 mol % ethylene; and/or d) an Mw/Mn of greater than 1 to 4, or greater than 1 to 3.

In an embodiment, polymer produced herein has less than 1400 ppm aluminum, or less than 1200 ppm, or less than 1000 ppm, or less than 500 ppm, or less than 100 ppm as determined by ICPES (Inductively Coupled Plasma Emission Spectrometry), which is described in J. W. Olesik, "Inductively Coupled Plasma-Optical Emission Spectroscopy," in the Encyclopedia of Materials Characterization, C. R. Brundle, C. A. Evans, Jr. and S. Wilson, eds., Butterworth-Heinemann, Boston, Mass., 1992, pp. 633-644, which is used herein for purposes of determining the amount of an element in a material; and/or in an embodiment, the polymer has less than 1400 ppm of the Group 3, 4, 5, or 6 transition metal, or of the Group 4 transition metal, or of Ti, Zr, and/or Hf, or less than 1200 ppm, or less than 1000 ppm, or less than 500 ppm, or less than 100 ppm, as determined by ICPES as discussed above.

In an embodiment of the invention, an ethylene polymer according to the instant disclosure has less than 1400 ppm hafnium, or less than 1200 ppm, or less than 1000 ppm, or less than 500 ppm, or less than 100 ppm as determined by ICPES.

In an embodiment of the invention, an ethylene polymer according to the instant disclosure has less than 1400 ppm zirconium, or less than 1200 ppm, or less than 1000 ppm, or less than 500 ppm, or less than 100 ppm as determined by ICPES.

In an embodiment, the polymer produced herein, which may be an ethylene polymer, has a density of greater than 0.95 g/cc, or greater than 0.955 g/cc, or greater than 0.96 g/cc. Density is determined according to ASTM D 1505.

$^{13}$C NMR data is collected at 120° C. in a 10 mm probe using a Varian spectrometer with a $^{1}$Hydrogen frequency of at least 400 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating is employed during the entire acquisition period. The spectra are acquired using time averaging to provide a signal to noise level adequate to measure the signals of interest. Samples are dissolved in tetrachloroethane-d$_2$ at concentrations between 10 to 15 wt % prior to being inserted into the spectrometer magnet. Prior to data analysis spectra are referenced by setting the chemical shift of the (—CH$_2$—)$_n$ signal where n>6 to 29.9 ppm. Chain ends for quantization are identified using the signals shown in the table below. N-butyl and n-propyl are not reported due to their low abundance (less than 5%) relative to the chain ends shown in the table below.

| Chain End | $^{13}$CNMR Chemical Shift |
|---|---|
| P~i-Bu | 23-5 to 25.5 and 25.8 to 26.3 ppm |
| E~i-Bu | 39.5 to 40.2 ppm |
| P~Vinyl | 41.5 to 43 ppm |
| E~Vinyl | 33.9 to 34.4 ppm |

Polymer resonance peaks are referenced to mmmm=21.8 ppm. Calculations involved in the characterization of polymers by NMR are described by F. A. Bovey in Polymer Conformation and Configuration (Academic Press, New York 1969) and J. Randall in Polymer Sequence Determination, $^{13}$C-NMR Method (Academic Press, New York, 1977).

Differential Scanning Calorimetry (DSC)

Crystallization temperature ($T_c$), melting temperature (or melting point, $T_m$), glass transition temperature ($T_g$) and heat of fusion ($H_f$) are measured using Differential Scanning Calorimetry (DSC) on a commercially available instrument (e.g., TA Instruments 2920 DSC). Typically, 6 to 10 mg of molded polymer or plasticized polymer are sealed in an aluminum pan and loaded into the instrument at room temperature. Data are acquired by heating the sample to at least 30° C. above its melting temperature, typically 220° C. for polypropylene, at a heating rate of 10° C./min. The sample is held for at least 5 minutes at this temperature to destroy its thermal history. Then the sample is cooled from the melt to at least 50° C. below the crystallization temperature, typically −100° C. for polypropylene, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures (Tm) reported are the peak melting temperatures from the second heat unless otherwise specified. For polymers displaying multiple peaks, the melting temperature is defined to be the peak melting temperature from the melting trace associated with the largest endothermic calorimetric response (as opposed to the peak occurring at the highest temperature). Likewise, the crystallization temperature is defined to be the peak crystallization temperature from the crystallization trace associated with the largest exothermic calorimetric response (as opposed to the peak occurring at the highest temperature).

Areas under the DSC curve are used to determine the heat of transition (heat of fusion, $H_f$, upon melting or heat of crystallization, $H_c$, upon crystallization), which can be used to calculate the degree of crystallinity (also called the percent crystallinity). The percent crystallinity (X %) is calculated using the formula: [area under the curve (in J/g)/H° (in J/g)]*100, where H° is the ideal heat of fusion for a perfect crystal of the homopolymer of the major monomer component. These values for H° are to be obtained from the *Polymer Handbook, Fourth Edition*, published by John Wiley and Sons, New York 1999, except that a value of 290 J/g is used for H° (polyethylene), a value of 140 J/g is used for H° (polybutene), and a value of 207 J/g is used for H° (polypropylene).

Heat of melting (Hm) is determined using the DSC procedure above except that the sample is cooled to −100° C., held for 5 minutes then heated at 10° C./min to 200° C. Hm is measured on the first melt, not the second melt. The Hm sample must have been aged at least 48 hours at room temperature and should not be heated to destroy thermal history.

Blends

In an embodiment, the polymer (e.g., the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In an embodiment, the polymer (e.g., the polyethylene or polypropylene) is present in the above blends, at from 10 to 99 wt %, based upon the weight of the polymers in the blend, or 20 to 95 wt %, or at least 30 to 90 wt %, or at least 40 to 90 wt %, or at least 50 to 90 wt %, or at least 60 to 90 wt %, or at least 70 to 90 wt %.

The blends described above may be produced by mixing the polymers of the invention with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX 1010 or IRGANOX 1076 available from Ciba-Geigy); phosphites (e.g., IRGAFOS 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

In an embodiment, the invention relates to polyolefins comprising ethylene, wherein the polyolefin is produced by a process comprising: contacting one or more olefins with a catalyst system as described herein at a temperature, a pressure, and for a period of time sufficient to produce a polyolefin. In some embodiments, the polyolefin comprises at least 50 mol %, e.g., at least 75 mol %, at least 99.9 mol % ethylene, of polymer units derived ethylene.

Films

In an embodiment, any of the foregoing polymers, such as the foregoing polypropylenes or blends thereof, may be used in a variety of end-use applications. Applications include, for example, mono- or multi-layer blown, extruded, and/or shrink films. These films may be formed by any number of well known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then, optionally, the combination could be oriented even further. Typically the films are oriented in the machine direction (MD) at a ratio of up to 15, or between 5 and 7, and in the transverse direction (TD) at a ratio of up to 15, or 7 to 9. However, in an embodiment, the film is oriented to the same extent in both the MD and TD directions.

The films may vary in thickness depending on the intended application; however, films of a thickness from 1 to 50 µm are usually suitable. Films intended for packaging are usually from 10 to 50 µm thick. The thickness of the sealing layer is typically 0.2 to 50 µm. There may be a sealing layer on both the inner and outer surfaces of the film or the sealing layer may be present on only the inner or the outer surface.

In an embodiment, one or more layers may be modified by corona treatment, electron beam irradiation, gamma irradiation, flame treatment, or microwave. In an embodiment, one or both of the surface layers is modified by corona treatment.

Molded Products

The compositions described herein (or polypropylene compositions) may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

Further, the compositions described herein (or polypropylene compositions) may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. Typically, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The tool stays closed to cool the film and the tool is then opened. The shaped laminate is then removed from the tool. The thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution.

Blow molding is another suitable forming means for use with the compositions of this invention, which includes injection blow molding, multi-layer blow molding, extrusion blow molding, and stretch blow molding, and is especially suitable for substantially closed or hollow objects, such as, for example, gas tanks and other fluid containers.

Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

Likewise, molded articles may be fabricated by injecting molten polymer into a mold that shapes and solidifies the molten polymer into desirable geometry and thickness of molded articles. Sheets may be made either by extruding a substantially flat profile from a die, onto a chill roll, or by calendaring. Sheets are generally considered to have a thickness of from 254 μm to 2540 μm (10 mils to 100 mils), although any given sheet may be substantially thicker.

Non-Wovens and Fibers

The polyolefin compositions described above may also be used to prepare nonwoven fabrics and fibers of this invention in any nonwoven fabric and fiber making process, including but not limited to, melt blowing, spinbonding, film aperturing, and staple fiber carding. A continuous filament process may also be used. Or a spunbonding process is used. The spunbonding process is well known in the art. Generally, it involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding.

Embodiments

Accordingly, the instant disclosure relates to the following embodiments:

1. A catalyst compound of represented by the Formula (I):

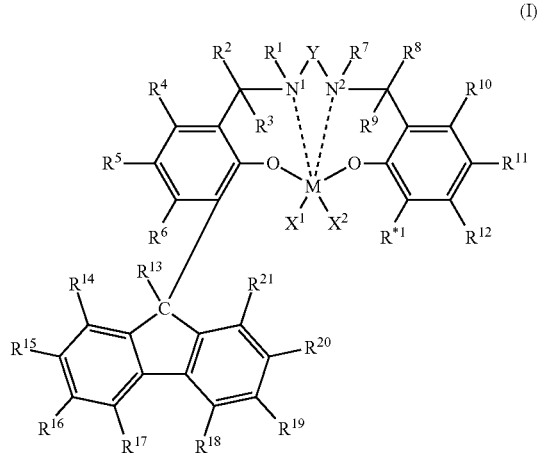

(I)

wherein:
each solid line represents a covalent bond and each dotted line represents a bond having a varying degree of covalency and a varying degree of coordination;
wherein M is a Group 3, 4, 5, or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure, provided however when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ is, independently, hydrogen, a $C_1$ to $C_{40}$ hydrocarbyl radical, a substituted $C_1$ to $C_{40}$ hyrdrocarbyl radical (such as, a functional group comprising elements from Groups 13 to 17 of the periodic table of the elements);
optionally, wherein two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ may independently join together to form a $C_4$ to $C_{62}$ cyclic or polycyclic ring structure, or a combination thereof;
wherein $R^{*1}$ comprises a group other than a substituted or unsubstituted fluorenyl group; and
wherein Y is a $C_1$ to $C_{40}$ divalent hydrocarbyl radical comprising a linker backbone comprising from 1 to 18 carbon atoms bridging between nitrogen atoms $N^1$ and $N^2$.

2. The catalyst compound of Embodiment 1, wherein $R^{*1}$ is selected from a substituted or unsubstituted $C_4$-$C_{20}$ aliphatic radical, a substituted or unsubstituted $C_4$-$C_{20}$ alicyclic radical, or a substituted or unsubstituted $C_5$-$C_{40}$ aryl radical.

3. The catalyst compound of Embodiment 1 or 2, wherein $R^{*1}$ comprises an electron withdrawing functional group selected from the group consisting of —$NO_2$, —$CF_3$, —$CCl_3$, —$CBr_3$, —$CI_3$, —CN, —$NCR^\alpha$, —$SO_3H$, —COOH, —CHO, —F, —Cl, —Br, —I, —$COOR^\alpha$, —$COR^\alpha$, —$NR^\alpha_3{}^+$, wherein each $R^\alpha$ is independently hydrogen, a $C_1$ to $C_{20}$ alkyl radical.

4. The catalyst compound of any of Embodiments 1 to 3, wherein $R^{*1}$ comprises a substituted or unsubstituted cyclopentadienyl radical represented by the Formula:

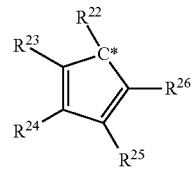

wherein C* indicates an attachment carbon of the radical;
each of $R^{22}$, $R^{23}$, $R^{24}$, $R^{25}$, and $R^{26}$ is, independently, hydrogen, a $C_1$ to $C_{40}$ hydrocarbyl radical, a functional group comprising elements from Groups 13 to 17 of the periodic table of the elements, optionally, wherein two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, and $R^{26}$ independently optionally join together to form a $C_4$ to $C_{62}$ cyclic or polycyclic ring structure, or a combination thereof.

5. The catalyst compound of any of Embodiments 1 to 4, wherein the catalyst compound is represented by the Formula:

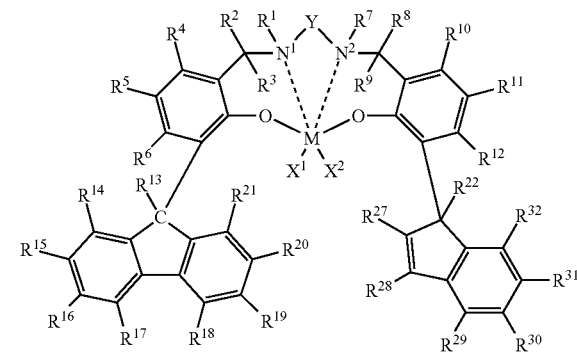

each $R^{22}$, $R^{27}$, $R^{28}$, $R^{29}$, $R^{30}$, $R^{31}$, and $R^{32}$ is, independently, hydrogen, a $C_1$ to $C_{40}$ hydrocarbyl radical, a substituted $C_1$ to $C_{40}$ hyrdrocarbyl radical (such as, a functional group comprising elements from Groups 13 to 17 of the periodic table of the elements), optionally two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{27}$, $R^{28}$, $R^{29}$, $R^{30}$, $R^{31}$, and $R^{32}$ may independently join together to form a $C_4$ to $C_{62}$ cyclic or polycyclic ring structure, or a combination thereof, and $R^1$ to $R^{21}$, M, O, Y, $N^1$, $N^2$, $X^1$, and $X^2$ are as defined in Formula (I).

6. The catalyst compound of Embodiment 1, wherein $R^{*1}$ comprises a substituted or unsubstituted pyrrole radical represented by the Formula:

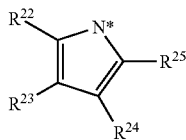

wherein N* indicates an attachment nitrogen of the radical; each of $R^{22}$, $R^{23}$, $R^{24}$, and $R^{25}$ is, independently, hydrogen, a $C_1$ to $C_{40}$ hydrocarbyl radical, a functional group comprising elements from Groups 13 to 17 of the periodic table of the elements, optionally, wherein optionally two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, and $R^{25}$ may independently join together to form a $C_4$ to $C_{62}$ cyclic or polycyclic ring structure, or a combination thereof.

7. The catalyst compound of Embodiment 1 or 6, wherein the catalyst compound is represented by the Formula:

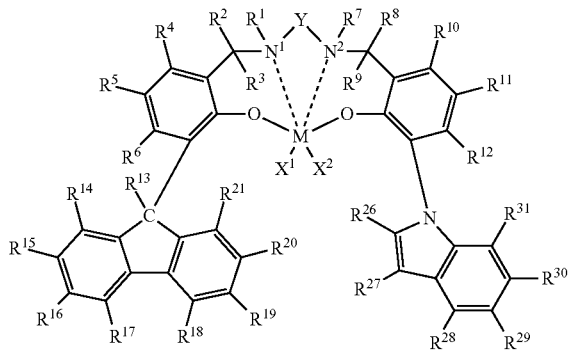

where N is nitrogen, each $R^{26}$, $R^{27}$, $R^{28}$, $R^{29}$, $R^{30}$, and $R^{31}$ is, independently, hydrogen, a $C_1$ to $C_{40}$ hydrocarbyl radical, a substituted $C_1$ to $C_{40}$ hyrdrocarbyl radical (such as a functional group comprising elements from Groups 13 to 17 of the periodic table of the elements), optionally two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{26}$, $R^{27}$, $R^{28}$, $R^{29}$, $R^{30}$, and $R^{31}$ may independently join together to form a $C_4$ to $C_{62}$ cyclic or polycyclic ring structure, or a combination thereof, and $R^1$ to $R^{21}$, M, O, Y, $N^1$, $N^2$, $X^1$, and $X^2$ are as defined in Formula (I).

8. The catalyst compound of Embodiment 1, 6, or 7, wherein the catalyst compound has a structure according to the Formula:

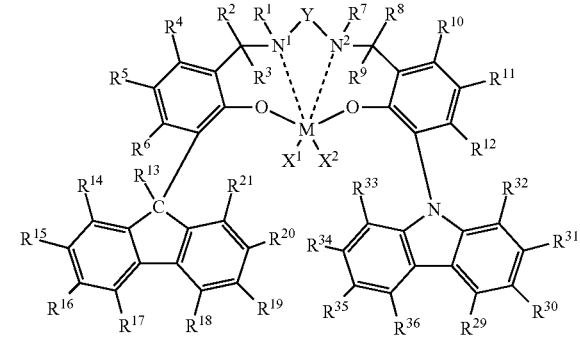

where N is nitrogen, each $R^{29}$, $R^{30}$, $R^{31}$, $R^{32}$, $R^{33}$, $R^{34}$, $R^{35}$, and $R^{36}$ is, independently, hydrogen, a $C_1$ to $C_{40}$ hydrocarbyl radical, a substituted $C_1$ to $C_{40}$ hydrocarbyl radical (such as, a functional group comprising elements from Groups 13 to 17 of the periodic table of the elements), optionally two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{29}$, $R^{30}$, $R^{31}$, $R^{32}$, $R^{33}$, $R^{34}$, $R^{35}$, and $R^{36}$ may independently join together to form a $C_4$ to $C_{62}$ cyclic or polycyclic ring structure, or a combination thereof, and $R^1$-$R^{21}$, M, O, Y, $N^1$, $N^2$, $X^1$, and $X^2$ are as defined in Formula (1).

9. The catalyst compound of Embodiment 1, wherein the catalyst compound has a structure according to the Formula:

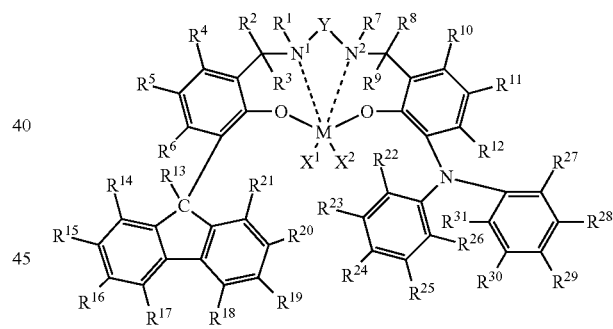

where N is nitrogen, each $R^{22}$, $R^{23}$, $R^{24}$, $R^{25}$, $R^{26}$, $R^{27}$, $R^{28}$, $R^{29}$, $R^{30}$, and $R^{31}$ is, independently, hydrogen, a $C_1$ to $C_{40}$ hydrocarbyl radical, a substituted $C_1$ to $C_{40}$ hyrdrocarbyl radical (such as a functional group comprising elements from Groups 13 to 17 of the periodic table of the elements), optionally two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ may independently join together to form a $C_4$ to $C_{62}$ cyclic or polycyclic ring structure, or a combination thereof, and $R^1$-$R^{21}$, M, O, Y, $N^1$, $N^2$, $X^1$, and $X^2$ are as defined in Formula (1).

10. The catalyst compound of Embodiment 1 or 2, wherein the catalyst compound has a structure according to the Formula:

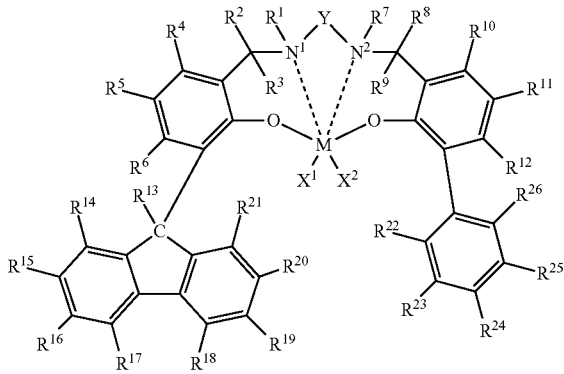

where N is nitrogen, each $R^{22}$, $R^{23}$, $R^{24}$, $R^{25}$, and $R^{26}$ is, independently, hydrogen, a $C_1$ to $C_{40}$ hydrocarbyl radical, a substituted $C_1$ to $C_{40}$ hyrdrocarbyl radical (such as, a functional group comprising elements from Groups 13 to 17 of the periodic table of the elements), optionally two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, and $R^{26}$ may independently join together to form a $C_4$ to $C_{62}$ cyclic or polycyclic ring structure, or a combination thereof, and $R^1$-$R^{21}$, M, O, Y, $N^1$, $N^2$, $X^1$, and $X^2$ are as defined in Formula (1).

11. The catalyst compound of any of Embodiments 1 to 10, wherein at least one of $R^5$ and/or $R^{11}$ is selected from the group consisting of $C_1$ to $C_{10}$ alkyl, $C_1$ to $C_{10}$ alkoxy, and $C_6$ to $C_{15}$ aryl.

12. The catalyst compound of any of Embodiments 1 to 11, wherein at least one of $R^5$ and/or $R^{11}$ comprises an electron withdrawing functional group selected from the group consisting of —$NO_2$, —$CF_3$, —$CCl_3$, —$CBr_3$, —$CI_3$, —CN, —$NCR^\alpha$, —$SO_3H$, —COOH, —CHO, —F, —Cl, —Br, —I, —$COOR^\alpha$, —$COR^\alpha$, —$NR^\alpha_3{}^+$, wherein each $R^\alpha$ is independently hydrogen, a $C_1$ to $C_{20}$ alkyl radical.

13. The catalyst compound of any of Embodiments 1 to 12, wherein M is Ti, Zr, or Hf.

14. The catalyst compound of any of Embodiments 1 to 13, wherein at least one of $X^1$ and $X^2$ is, independently, a halogen or a $C_1$ to $C_7$ hydrocarbyl radical.

15. The catalyst compound of Embodiment 1, wherein each of $X^1$ and $X^2$ is a benzyl radical.

16. The catalyst compound of Embodiment 1, wherein $R^5$ comprises a $C_1$ to $C_{10}$ alkyl radical, $C_1$ to $C_{10}$ alkoxy, and each of $R^1$, $R^2$, $R^3$, $R^4$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{*1}$ is, independently, hydrogen, a halogen, or a $C_1$ to $C_{10}$ hydrocarbyl radical.

17. The catalyst compound of Embodiment 1, wherein $R^5$ comprises a $C_1$ to $C_{10}$ alkyl radical, $C_1$ to $C_{10}$ alkoxy radical, $R^{11}$ comprises a $C_1$ to $C_{10}$ alkyl radical, and each of $R^1$, $R^2$, $R^3$, $R^4$, $R^6$, $R^7$, $R^8$, $R^9$, $R^{10}$, $R^{12}$, $R^{13}$, $R^{14}$, $R^{15}$, $R^{16}$, $R^{17}$, $R^{18}$, $R^{19}$, $R^{20}$, $R^{21}$, and $R^{*1}$ is, independently, hydrogen, a halogen, or a $C_1$ to $C_{10}$ hydrocarbyl radical.

18. The catalyst compound of Embodiment 1, wherein $R^5$ comprises a $C_1$ to $C_{10}$ alkyl radical, $C_1$ to $C_{10}$ alkyl radical, $R^{11}$ and $R^{*1}$, independently comprise a $C_1$ to $C_{10}$ alkyl radical, and each of $R^1$, $R^2$, $R^3$, $R^4$, $R^6$, $R^7$, $R^8$, $R^9$, $R^{10}$, $R^{12}$, $R^{13}$, $R^{14}$, $R^{15}$, $R^{16}$, $R^{17}$, $R^{18}$, $R^{19}$, $R^{20}$, and $R^{21}$, is, independently, hydrogen, a halogen, or a $C_1$ to $C_{10}$ hydrocarbyl radical.

19. The catalyst compound of any of Embodiments 1 to 18, wherein $R^{13}$ is selected from the group consisting of $C_1$ to $C_{10}$ alkyl, $C_1$ to $C_{10}$ alkyl radical, $C_1$ to $C_{10}$ alkoxy, and $C_6$ to $C_{15}$ aryl.

20. The catalyst compound of any of Embodiments 1 to 19, wherein Y is a $C_1$ to $C_{40}$ divalent hydrocarbyl radical comprising O, S, S(O), S(O)$_2$, Si(R')$_2$, P(R'), N, N(R'), or a combination thereof, wherein each R' is independently a $C_1$ to $C_{18}$ hydrocarbyl radical.

21. The catalyst compound of any of Embodiments 1 to 20, wherein Y is a divalent $C_1$ to $C_{20}$ hydrocarbyl radical.

22. The catalyst compound of any of Embodiments 1 to 20, wherein Y is —$CH_2CH_2$ $CH_2$— or 1,2-cyclohexylene.

23. The catalyst compound of any of Embodiments 1 to 20, wherein Y is —$CH_2CH_2$—.

24. The catalyst compound of any of Embodiments 1 to 10, wherein:

M is Zr or Hf;
$X^1$ and $X^2$ are benzyl radicals;
$R^5$ and $R^{11}$ are independently a methyl or t-butyl radical;
$R^{13}$ comprises a methyl, or 4-methylphenyl radical;
$R^1$, $R^2$, $R^3$ $R^4$, $R^6$, $R^7$, $R^8$ $R^9$, $R^{10}$, $R^{11}$, $R^{12}$, $R^{14}$, $R^{15}$, $R^{16}$, $R^{17}$, $R^{18}$, $R^{19}$, $R^{20}$, and $R^{21}$ are hydrogen; and
Y is —$CH_2CH_2$—.

25. A catalyst system comprising the reaction product of catalyst compound of any of Embodiments 1 to 24 and an activator.

26. The catalyst system of Embodiment 25, wherein the activator comprises an alumoxane or a non-coordinating anion.

27. The catalyst system of Embodiment 25, wherein the activator is selected from the group consisting of: methylalumoxane, ethylalumoxane, isobutyl alumoxane, N,N-dimethylanilinium tetra(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetra (perfluorophenyl)borate, triphenylcarbenium tetrakis (perfluorophenyl)borate, 1-(4-(tris(pentafluorophenyl)borate)-2,3,5,6-tetrafluorophenyl)pyrrolidinium, tetrakis (pentafluorophenyl)borate, and 4-(tris(pentafluorophenyl)borate)-2,3,5,6-tetrafluoropyridine.

28. A process comprising:
contacting one or more olefins with a catalyst system of any of Embodiments 25 to 27 at a temperature, a pressure, and for a period of time sufficient to produce a polyolefin.

29. The process of Embodiment 28, wherein the temperature is from about 0° C. to about 300° C., the pressure is from about 0.35 MPa to about 10 MPa, the time is from about 0.1 minutes to about 24 hours, or a combination thereof.

30. The process of Embodiment 28, wherein the temperature is from about 50° C. to about 150° C.

31. A polyolefin comprising ethylene, wherein the polyolefin is produced by a process comprising:
contacting ethylene and, optionally, one or more comonomers with a catalyst system of any of Embodiments 25 to 27 at a temperature, a pressure, and for a period of time sufficient to produce a polyolefin.

32. The polyolefin of Embodiment 31, comprising at least 50 mol % of polymer units derived from ethylene.

33. The polyolefin of Embodiment 31, comprising at least 75 mol % of polymer units derived from ethylene.

34. The polyolefin of Embodiment 31, comprising at least 99.9 mol % of polymer units derived from ethylene.
35. The polyolefin of any of Embodiments 31 to 34, comprising an Mn of 250 g/mol to 100,000 g/mol.
36. The polyolefin of any of Embodiments 31 to 35, wherein the commoner comprises hexene and the polyolefin further comprises 0.1 to <50 mol % polymer units derived from 1-hexene.

EXPERIMENTAL

Melt index (MI) also referred to as $I_2$, reported in g/10 min, is determined according to ASTM D1238, 190° C., 2.16 kg load.

High load melt index (HLMI) also referred to as $I_{21}$, reported in g/10 min, is determined according to ASTM D1238, 190° C., 21.6 kg load.

Melt index ratio (MIR) is MI divided by HLMI as determined by ASTM 1238.

Density is determined according to ASTM D1505.

Bulk Density is measured according to ASTM D1895.

Mw, Mn, and Mz, may be determined by Rapid GPC and percent of 1-hexene incorporation may be determined by FT-IR. To determine various molecular weight related values by GPC, high temperature size exclusion chromatography is performed using an automated "Rapid GPC" system as generally described in U.S. Pat. Nos. 6,491,816; 6,491,823; 6,475,391; 6,461,515; 6,436,292; 6,406,632; 6,175,409; 6,454,947; 6,260,407; and 6,294,388; each of which is fully incorporated herein by reference for US purposes. This apparatus has a series of three 30 cm*7.5 mm linear columns, each containing PLgel 10 μm, Mix B. The GPC system is calibrated using polystyrene standards ranging from 580-3,390,000 g/mol. The system is operated at an eluent flow rate of 2.0 mL/minutes and an oven temperature of 165° C. 1,2,4-trichlorobenzene is used as the eluent. The polymer samples are dissolved in 1,2,4-trichlorobenzene at a concentration of 0.1-0.9 mg/mL. 250 uL of a polymer solution is injected into the system. The concentration of the polymer in the eluent is monitored using an evaporative light scattering detector. The molecular weights presented are relative to linear polystyrene standards and are uncorrected.

EXAMPLES

The foregoing discussion can be further described with reference to the following non-limiting examples.

Starting material preparations: Solvents, polymerization grade toluene and isohexane are supplied by ExxonMobil Chemical Company and thoroughly dried and degassed prior to use. Polymerization grade ethylene is used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company. TnOAl (tri-n-octylaluminum, neat) is used as a 2 mmol/L solution in toluene.

Guidance on the general preparation of catalyst compounds described herein may be found and adapted as appropriate in U.S. Ser. No. 61/679,488, filed Aug. 3, 2012; Ser. No. 13/921,532, filed Jun. 19, 2013; 61/679,505, filed Aug. 3, 2012; Ser. No. 13/921,709, filed Jun. 19, 2013; 61/679,527, filed Aug. 3, 2012; Ser. No. 13/921,761, filed Jun. 19, 2013; 61/722,110, filed Nov. 2, 2012; Ser. No. 14/059,081, filed Oct. 21, 2013; 61/779,435, filed Mar. 13, 2013; 61/837,593, filed Jun. 20, 2013; Ser. No. 14/076,750, filed Nov. 11, 2013; 61/837,554, filed Jun. 20, 2013; Ser. No. 14/289,075, filed May 28, 2014; 61/837,569, filed Jun. 20, 2013; Ser. No. 14/298,575, filed Jun. 6, 2014; 61/837,588, filed Jun. 20, 2013; Ser. No. 14/289,186, filed May 28, 2014; 61/982,823, filed Apr. 22, 2014; and Ser. No. 14/557,813, filed Dec. 2, 2014, each of which is incorporated herein by reference.

All reactions are carried out under a purified nitrogen atmosphere using standard glovebox, high vacuum or Schlenk techniques, unless otherwise noted. All solvents used are anhydrous, de-oxygenated and purified according to known procedures. All starting materials are either purchased from Aldrich and purified prior to use or prepared according to procedures known to those skilled in the art.

Polymerization Process:

Ethylene/1-octene copolymerizations are carried out in a parallel pressure reactor, which is described in U.S. Pat. Nos. 6,306,658; 6,455,316; 6,489,1681; WO 00/09255; and Murphy et al., *J. Am. Chem. Soc.*, 2003, 125, 4306-4317, each of which is fully incorporated herein by reference. A preweighed glass vial insert and disposable stirring paddle are fitted to each reaction vessel of the reactor, which contains 48 individual reaction vessels. The reactor is then closed and each vessel is individually heated to a set temperature (100° C.) and pressurized to a pre-determined pressure of ethylene (120 or 135 psi). 100 uL of 1-octene (637 umol) is injected into each reaction vessel through a valve, followed by 500 uL of isohexane. 500 equivalents of methylalumoxane solution (30 wt % in toluene) is then added to act as a co-catalyst/scavenger. The contents of the vessel are then stirred at 800 rpm. A toluene solution of catalyst and another aliquot of isohexane (500 uL) are then added to the reactor. All runs are performed in triplicate. The reaction is then allowed to proceed until a set time limit (usually 30 min) or until a set amount of ethylene had been taken up by the reaction (ethylene pressure is maintained in each reaction vessel at the pre-set level by computer control). At this point, the reaction is quenched by exposure to air. After the polymerization reaction, the glass vial insert containing the polymer product and solvent is removed from the pressure cell and the inert atmosphere glovebox and the volatile components are removed using a Genevac HT-12 centrifuge and Genevac VC3000D vacuum evaporator operating at elevated temperature and reduced pressure. The vial is then weighed to determine the yield of the polymer product. The resultant polymer is analyzed by Rapid GPC to determine the molecular weight, by FT-IR to determine comonomer incorporation, and by DSC to determine melting point.

TABLE 1

Reaction conditions for ethylene-octene (EO) copolymerization with MAO as activator.

| | |
|---|---|
| Catalyst loading | 0.020 μmol |
| MAO | 10 μmol (500 equivalents) |
| Temperature | 100° C. |
| Pressure | 120 or 135 psi |
| 1-Octene | 100 μL |
| Total Volume | 5 mL |
| Solvent | Isohexane |
| Quench Value | 20 psi |
| Maximum Reaction Time | 30 minutes |

TABLE 2

Catalyst activity and polymer properties for EO copolymerization with Inventive catalyst compounds using MAO as activator.

| Run | Catalyst* | P setpt (psi) | time (s) | yield (g) | activity (g/mmol-hr) | Mw (g/mol) | Mn (g/mol) | Mw/Mn | weight % 1-octene | Polymer Tm (° C.) |
|---|---|---|---|---|---|---|---|---|---|---|
| 1 | Cat. 1 | 135 | 78.2 | 0.063 | 145013 | 317294 | 194442 | 1.6 | 2.4 | 125.1 |
| 2 | Cat. 1 | 135 | 28.4 | 0.095 | 602113 | 284166 | 172747 | 1.6 | 3.2 | 122.5 |
| 1 | Cat. 2 | 135 | 391.2 | 0.091 | 41871 | 972570 | 492841 | 2.0 | 5.5 | 115.8 |
| 2 | Cat. 2 | 135 | 243.7 | 0.072 | 53180 | 1224732 | 732866 | 1.7 | 4.9 | 116.6 |
| 1 | Cat. 3 | 135 | 45.5 | 0.067 | 265055 | 141270 | 86819 | 1.6 | 1.3 | 127.7 |
| 2 | Cat. 3 | 135 | 49.2 | 0.067 | 245122 | 162393 | 95639 | 1.7 | 1.7 | 128.0 |
| 1 | Cat. 4 | 135 | 564.4 | 0.036 | 11481 | 190336 | 109100 | 1.7 | 0.3 | 125.4 |
| 2 | Cat. 4 | 135 | 585.8 | 0.041 | 12598 | 224760 | 126701 | 1.8 | 1.1 | 125.6 |
| 1 | Cat. 5 | 135 | 150.9 | 0.042 | 50099 | 206023 | 133656 | 1.5 | 0.7 | 128.9 |
| 2 | Cat. 5 | 135 | 219.3 | 0.039 | 32011 | 174421 | 71862 | 2.4 | 0.0 | 128.9 |
| 1 | Cat. 6 | 135 | 1800.5 | 0.013 | 1300 | 714085 | 13348 | 53.5 | 2.4 | 122.8 |
| 2 | Cat. 6 | 135 | 1800.4 | 0.012 | 1200 | 603932 | 16990 | 35.5 | 1.5 | 124.5 |
| 1 | Cat. 7 | 135 | 104.6 | 0.048 | 82600 | 93121 | 39238 | 2.4 | 1.7 | 129.3 |
| 2 | Cat. 7 | 135 | 271.8 | 0.051 | 33775 | 117915 | 50958 | 2.3 | 1.8 | 127.6 |
| 1 | Cat. 8 | 135 | 1094.9 | 0.039 | 6411 | 312387 | 55898 | 5.6 | 2.6 | 122.3 |
| 2 | Cat. 8 | 135 | 1350.4 | 0.038 | 5065 | 330002 | 98360 | 3.4 | 3.7 | 122.3 |
| 1 | Cat. 9 | 135 | 98.5 | 0.051 | 93198 | 160921 | 52524 | 3.1 | 2.0 | 125.0 |
| 2 | Cat. 9 | 135 | 127.4 | 0.058 | 81947 | 194610 | 59866 | 3.3 | 2.1 | 125.6 |
| 1 | Cat. 10 | 135 | 636.9 | 0.041 | 11587 | 588199 | 72863 | 8.1 | 4.6 | 119.4 |
| 2 | Cat. 10 | 135 | 789.0 | 0.043 | 9810 | 596743 | 129765 | 4.6 | 5.1 | 118.6 |
| 1 | Cat. 11 | 135 | 9.1 | 0.110 | 2175824 | 36906 | 6005 | 6.1 | 11.3 | 119.0 |
| 2 | Cat. 11 | 135 | 9.8 | 0.109 | 2002041 | 42968 | 7017 | 6.1 | 8.3 | 120.9 |
| 1 | Cat. 12 | 135 | 24.4 | 0.080 | 590164 | 54812 | 30683 | 1.8 | 5.9 | 118.5 |
| 2 | Cat. 12 | 135 | 48.2 | 0.086 | 321162 | 151286 | 39991 | 3.8 | 7.5 | 120.3 |
| 1 | Cat. 13 | 135 | 216.7 | 0.044 | 36548 | 140933 | 48718 | 2.9 | 5.0 | 123.0 |
| 2 | Cat. 13 | 135 | 339.3 | 0.053 | 28117 | 145249 | 56884 | 2.6 | 3.5 | 124.8 |
| 1 | Cat. 14 | 135 | 1800.1 | 0.034 | 3400 | 937978 | 48926 | 19.2 | 7.7 | 117.3 |
| 2 | Cat. 14 | 135 | 1800.5 | 0.031 | 3099 | 1034466 | 120779 | 8.6 | 6.4 | 119.3 |
| 1 | Cat. 15 | 135 | 98.4 | 0.056 | 102439 | 49563 | 25467 | 1.9 | 8.8 | 120.7 |
| 2 | Cat. 15 | 135 | 128.6 | 0.057 | 79782 | 71795 | 27726 | 2.6 | 5.5 | 122.4 |
| 1 | Cat. 16 | 135 | 560.7 | 0.045 | 14446 | 251112 | 102359 | 2.5 | 9.0 | 113.3 |
| 2 | Cat. 16 | 135 | 583.0 | 0.043 | 13276 | 432808 | 134005 | 3.2 | 8.9 | 115.2 |
| 1 | Cat. 17 | 135 | 10.6 | 0.096 | 1630189 | 30629 | 8049 | 3.8 | 15.2 | 119.8 |
| 2 | Cat. 17 | 135 | 11.5 | 0.093 | 1455652 | 25881 | 7467 | 3.5 | 9.3 | 120.8 |
| 1 | Cat. 18 | 135 | 72.1 | 0.060 | 149792 | 103824 | 42131 | 2.5 | 5.7 | 120.1 |
| 2 | Cat. 18 | 135 | 76.2 | 0.061 | 144094 | 101207 | 41606 | 2.4 | 5.9 | 121.7 |

Figure 1B:
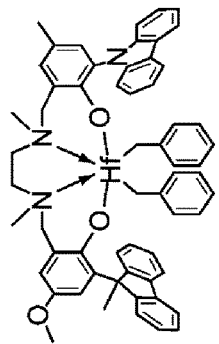
FIG. 1B illustrates exemplary catalysts 10 through 18, according to embodiments of the invention.
Figure 1B:
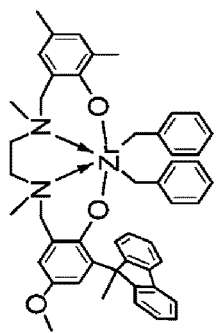
Figure 1B:
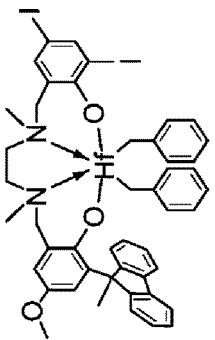
Figure 1B:
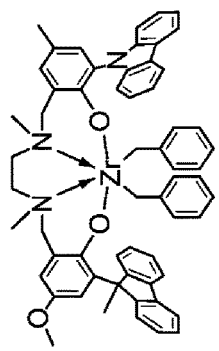
Figure 1B:
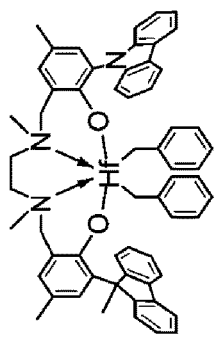
Figure 1B:
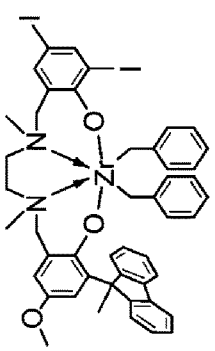
Figure 1B:
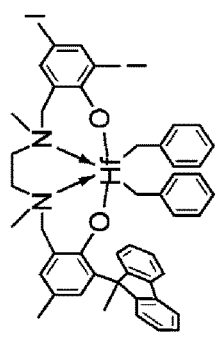
Figure 1B:
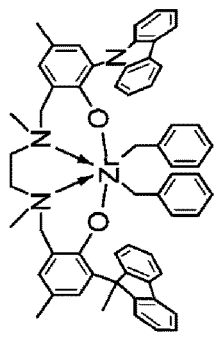
Figure 1B:
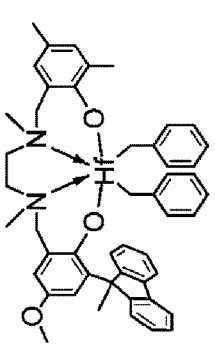

*Forumulas for Catalysts 1-9 shown in FIG. 1A and Catalysts 10-18 shown in FIG. 1B.

The catalysts in an embodiment provide improvement in catalyst activity, produce polymers with improved properties or both. For example, asymmetric catalysts may show significantly higher activity and/or capability of providing higher molecular weight polymers than corresponding symmetric di-carbazole substituted analogs. As such, catalysts according to one embodiment of the instant disclosure provide for an ability to control one or more characteristics of polymerization, molecular weight, comonomer insertion, and the like.

All documents described are fully incorporated herein by reference, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise, whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements, and vice versa.

What is claimed is:

1. A catalyst compound represented by the Formula (I):

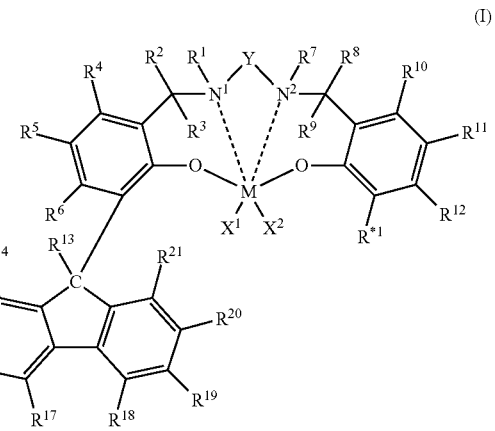

(I)

wherein each solid line represents a covalent bond and each dotted line represents a bond having a varying degree of covalency and a varying degree of coordination;
wherein M is a Group 3, 4, 5, or 6 transition metal;
$N^1$ and $N^2$ are nitrogen;
O is oxygen;

each of $X^1$ and $X^2$ is, independently, a univalent $C_1$ to $C_{20}$ hydrocarbyl radical, a univalent substituted $C_1$ to $C_{20}$, hydrocarbyl radical, a functional group comprising elements from Groups 13 to 17 of the periodic table of elements or $X^1$ and $X^2$ join together to form a $C_4$ to $C_{62}$ cyclic or polycyclic ring structure, provided that when M is trivalent $X^2$ is not present;

each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{*1}$, is, independently, hydrogen, a $C_1$ to $C_{40}$ hydrocarbyl radical, or a substituted $C_1$ to $C_{40}$ hydrocarbyl radical;

or a functional group comprising elements from Groups 13 to 17 of the periodic table of elements optionally, wherein two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ independently join together to form a $C_4$ to $C_{62}$ cyclic or polycyclic ring structure, or a combination thereof;

wherein $R^{*1}$ comprises a group other than a substituted or unsubstituted fluorenyl group; and wherein Y is a $C_1$ to $C_{40}$ divalent hydrocarbylene radical comprising a linker backbone comprising from 1 to 18 carbon atoms bridging between nitrogen atoms $N^1$ and $N^2$.

2. The catalyst compound of claim 1, wherein $R^{*1}$ comprises a substituted or unsubstituted $C_4$ to $C_{20}$ aliphatic radical, a substituted or unsubstituted $C_4$ to $C_{20}$ alicyclic radical, a substituted or unsubstituted $C_5$ to $C_{40}$ aryl radical, or an electron withdrawing functional group selected from the group consisting of —$NO_2$, —$CF_3$, —$CCl_3$, —$CBr_3$, —$CI_3$, —CN, —$NCR^\alpha$, 13 $SO_3H$, —COOH, —CHO, —F, —Cl, —Br, —I, —$COOR^\alpha$, —$COR^\alpha$, —$NRa^\alpha_3{}^+$, wherein each $R^\alpha$ is independently hydrogen, or a $C_1$ to $C_{20}$ alkyl radical.

3. The catalyst compound of claim 1, wherein $R^{*1}$ comprises a substituted or unsubstituted cyclopentadienyl radical represented by the Formula:

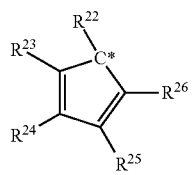

wherein C* indicates an attachment carbon of the radical;
each of $R^{22}$, $R^{23}$, $R^{24}$, $R^{25}$, and $R^{26}$ is, independently, hydrogen, a $C_1$ to $C_{40}$ hydrocarbyl radical, a functional group comprising elements from Groups 13 to 17 of the periodic table of the elements, optionally, wherein two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, and $R^{26}$ independently join together to form a $C_4$ to $C_{62}$ cyclic or polycyclic ring structure, or a combination thereof.

4. The catalyst compound of claim 1, wherein $R^{*1}$ comprises a substituted or unsubstituted pyrrole radical represented by the Formula:

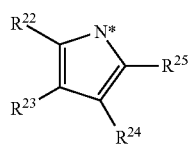

wherein N* indicates an attachment nitrogen of the radical;
each of $R^{22}$, $R^{23}$, $R^{24}$, and $R^{25}$ is, independently, hydrogen, a $C_1$ to $C_{40}$ hydrocarbyl radical, a functional group comprising elements from Groups 13 to 17 of the periodic table of the elements, optionally, wherein two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, and $R^{25}$ independently join together to form a $C_4$ to $C_{62}$ cyclic or polycyclic ring structure, or a combination thereof.

5. The catalyst compound of claim 1, wherein at least one of $R^5$ and/or $R^{11}$ is $C_1$ to $C_{10}$ alkyl, $C_1$ to $C_{10}$ alkoxy, $C_6$ to $C_{15}$ aryl, or an electron withdrawing functional group selected from the group consisting of —$NO_2$, —$CF_3$, —$CCl_3$, —$CBr_3$, —$CI_3$, —CN, —$NCR^\alpha$, —$SO_3H$, —COOH, —CHO, —F, —Cl, —Br, —I, —$COOR^\alpha$, —$COR^\alpha$, —$NR^\alpha_3{}^+$, wherein each $R^\alpha$ is independently hydrogen, or a $C_1$ to $C_{20}$ alkyl radical.

6. The catalyst compound of claim 1, wherein $R^5$ is a $C_1$ to $C_{10}$ alkyl radical, $C_1$ to $C_{10}$ alkoxy radical, and each of $R^1$, $R^2$, $R^3$, $R^4$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, and $R^{*1}$ is, independently, hydrogen, a halogen, or a $C_1$ to $C_{10}$ hydrocarbyl radical.

7. The catalyst compound of claim 1, wherein $R^5$ is a $C_1$ to $C_{10}$ alkyl radical, $C_1$ to $C_{10}$ alkoxy radical, $R^{11}$ is a $C_1$ to $C_{10}$ alkyl radical, and each of $R^1$, $R^2$, $R^3$, $R^4$, $R^6$, $R^7$, $R^8$, $R^9$, $R^{10}$, $R^{12}$, $R^{13}$, $R^{14}$, $R^{15}$, $R^{16}$, $R^{17}$, $R^{18}$, $R^{19}$, $R^{20}$, $R^{21}$, and $R^{*1}$ is, independently, hydrogen, a halogen, or a $C_1$ to $C_{10}$ hydrocarbyl radical.

8. The catalyst compound of claim 1, wherein $R^5$ is a $C_1$ to $C_{10}$ alkyl radical, $C_1$ to $C_{10}$ alkoxy radical, $R^{11}$ and $R^{*1}$, independently is a $C_1$ to $C_{10}$ alkyl radical, and each of $R^1$, $R^2$, $R^3$, $R^4$, $R^6$, $R^7$, $R^8$, $R^9$, $R^{10}$, $R^{12}$, $R^{13}$, $R^{14}$, $R^{15}$, $R^{16}$, $R^{17}$, $R^{18}$, $R^{19}$, $R^{20}$, and $R^{21}$, is, independently, hydrogen, a halogen, or a $C_1$ to $C_{10}$ hydrocarbyl radical.

9. The catalyst compound of claim 1, wherein $R^{13}$ is $C_1$ to $C_{10}$ alkyl, $C_1$ to $C_{10}$ alkoxy or $C_6$ to $C_{15}$ aryl.

10. The catalyst compound of claim 1, wherein Y is a $C_1$ to $C_{40}$ divalent hydrocarbylene radical comprising O, S, S(O), $S(O)_2$, $Si(R')_2$, P(R'), N, N(R'), or a combination thereof, wherein each R' is independently a $C_1$ to $C_{18}$ hydrocarbyl radical.

11. The catalyst compound of claim 1, wherein Y is a divalent $C_1$ to $C_{20}$ hydrocarbyl radical.

12. The catalyst compound of claim 1, wherein Y is —$CH_2CH_2CH_2$—, 1,2-cyclohexylene, or —$CH_2CH_2$—.

13. The catalyst compound of claim 1, wherein M is Ti, Zr, or Hf and/or at least one of $X^1$ and $X^2$ is, independently, a halogen or a $C_1$ to $C_7$ hydrocarbyl radical.

14. The catalyst compound of claim 1, wherein M is Ti, Zr, or Hf and each of $X^1$ and $X^2$ is a benzyl radical.

15. The catalyst compound of claim 1, wherein M is Ti, Zr, or Hf; $R^5$ is a $C_1$ to $C_{10}$ alkyl radical, $C_1$ to $C_{10}$ alkoxy radical; $R^{11}$ is a $C_1$ to $C_{10}$ alkyl radical; $R^{13}$ is $C_1$ to $C_{10}$ alkyl, $C_1$ to $C_{10}$ alkoxy or $C_6$ to $C_{15}$ aryl.

16. The catalyst compound of claim 1, wherein:
M is Zr or Hf;
$X^1$ and $X^2$ are benzyl radicals;
$R^5$ and $R^{11}$ are independently a methyl or t-butyl radical;
$R^{13}$ is a methyl, or 4-methylphenyl radical;
$R^1$, $R^2$, $R^3$, $R^4$, $R^6$, $R^7$, $R^8$, $R^9$, $R^{10}$, $R^{11}$, $R^{12}$, $R^{14}$, $R^{15}$, $R^{16}$, $R^{17}$, $R^{18}$, $R^{19}$, $R^{20}$, and $R^{21}$ are hydrogen; and
Y is —$CH_2CH_2$—.

17. A catalyst system comprising a reaction product of the catalyst compound of claim 1 and an activator.

18. The catalyst system of claim 17, wherein the activator comprises an alumoxane or a non-coordinating anion.

19. The catalyst system of claim 17, wherein the activator is selected from the group consisting of: methylalumoxane, ethylalumoxane, isobutyl alumoxane, N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis (perfluorophenyl)borate, 1-(4-(tris(pentafluorophenyl)borate)-2,3,5,6-tetrafluorophenyl)pyrrolidinium, and 4-(tris(pentafluorophenyl)borate)-2,3,5,6-tetrafluoropyridine.

20. A process comprising:
contacting one or more olefins with the catalyst system of claim 17 at a temperature, a pressure, and for a period of time sufficient to produce a polyolefin.

21. The process of claim 20, wherein the temperature is from about 0° C. to about 300° C., the pressure is from about 0.35 MPa to about 10 MPa, and the time is from about 0.1 minutes to about 24 hours.

22. The process of claim 20, wherein the temperature is from about 50° C. to about 150° C.

23. A process comprising:
contacting ethylene, optionally, one or more olefins with comonomers, and the catalyst system of claim 17 at a temperature, a pressure, and for a period of time sufficient to produce a polymer comprising ethylene.

24. The process of claim 23, where the polymer comprises at least 50 mol % of polymer units derived from ethylene.

25. The process of claim 23, where the polymer comprises an Mn of 250 g/mol to 100,000 g/mol.

26. The process of claim 23, where the polymer comprises 0.1 to 50 mol % polymer units derived from 1-hexene.

27. The process of claim 23, where the polymer comprises at least 75 mol % of polymer units derived ethylene.

28. The process of claim 23, where the polymer comprises at least 99.9 mol % of polymer units derived ethylene.

29. The catalyst compound of claim 2, wherein:
M is Zr or Hf;
$R^5$ and $R^{11}$ are independently a methyl or t-butyl radical;
$R^{13}$ is a methyl, or 4-methylphenyl radical;
$R^1$, $R^2$, $R^3$, $R^4$, $R^6$, $R^7$, $R^8$, $R^9$, $R^{10}$, $R^{11}$, $R^{12}$, $R^{14}$, $R^{15}$, $R^{16}$, $R^{17}$, $R^{18}$, $R^{19}$, $R^{20}$, and $R^{21}$ are hydrogen; and
Y is —CH$_2$CH$_2$—.

30. A catalyst system comprising a reaction product of the catalyst compound of claim 2 and an activator.

31. A process comprising:
contacting one or more olefins with a catalyst system comprising a reaction product of the catalyst compound of claim 2 and an activator at a temperature, a pressure, and for a period of time sufficient to produce a polyolefin, wherein the temperature is from about 0° C. to about 300° C., the pressure is from about 0.35 MPa to about 10 MPa, and the time is from about 0.1 minutes to about 24 hours.

32. The catalyst compound of claim 3, wherein M is Ti, Zr, or Hf; $R^5$ is a $C_1$ to $C_{10}$ alkyl radical, $C_1$ to $C_{10}$ alkoxy radical; $R^{11}$ is a $C_1$ to $C_{10}$ alkyl radical; $R^{13}$ is $C_1$ to $C_{10}$ alkyl, $C_1$ to $C_{10}$ alkoxy or $C_6$ to $C_{15}$ aryl.

33. A catalyst system comprising a reaction product of the catalyst compound of claim 3 and an activator.

34. A process comprising:
contacting one or more olefins with a catalyst system comprising a reaction product of the catalyst compound of claim 3 and an activator at a temperature, a pressure, and for a period of time sufficient to produce a polyolefin, wherein the temperature is from about 0° C. to about 300° C., the pressure is from about 0.35 MPa to about 10 MPa, and the time is from about 0.1 minutes to about 24 hours.

35. The catalyst compound of claim 4, wherein M is Ti, Zr, or Hf; $R^5$ is a $C_1$ to $C_{10}$ alkyl radical, $C_1$ to $C_{10}$ alkoxy radical; $R^{11}$ is a $C_1$ to $C_{10}$ alkyl radical; $R^{13}$ is $C_1$ to $C_{10}$ alkyl, $C_1$ to $C_{10}$ alkoxy or $C_6$ to $C_{15}$ aryl.

36. A catalyst system comprising a reaction product of the catalyst compound of claim 4 and an activator.

37. A process comprising:
contacting one or more olefins with a catalyst system comprising a reaction product of the catalyst compound of claim 4 and an activator at a temperature, a pressure, and for a period of time sufficient to produce a polyolefin, wherein the temperature is from about 0° C. to about 300° C., the pressure is from about 0.35 MPa to about 10 MPa, and the time is from about 0.1 minutes to about 24 hours.

38. A catalyst system comprising a reaction product of the catalyst compound of claim 7 and an activator.

39. A process comprising:
contacting one or more olefins with a catalyst system comprising a reaction product of the catalyst compound of claim 7 and an activator at a temperature, a pressure, and for a period of time sufficient to produce a polyolefin, wherein the temperature is from about 0° C. to about 300° C., the pressure is from about 0.35 MPa to about 10 MPa, and the time is from about 0.1 minutes to about 24 hours.

40. A catalyst system comprising a reaction product of the catalyst compound of claim 10 and an activator.

41. A process comprising:
contacting one or more olefins with a catalyst system comprising a reaction product of the catalyst compound of claim 10 and an activator at a temperature, a pressure, and for a period of time sufficient to produce a polyolefin, wherein the temperature is from about 0° C. to about 300° C., the pressure is from about 0.35 MPa to about 10 MPa, and the time is from about 0.1 minutes to about 24 hours.

42. A catalyst system comprising a reaction product of the catalyst compound of claim 16 and an activator.

43. A process comprising:
contacting one or more olefins with a catalyst system comprising a reaction product of the catalyst compound of claim 16 and an activator at a temperature, a pressure, and for a period of time sufficient to produce a polyolefin, wherein the temperature is from about 0° C. to about 300° C., the pressure is from about 0.35 MPa to about 10 MPa, and the time is from about 0.1 minutes to about 24 hours.

44. A catalyst compound represented by the Formula:

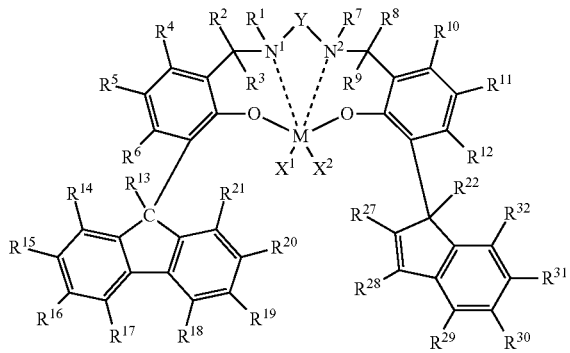

wherein M is a Group 3, 4, 5, or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a univalent substituted $C_1$ to $C_{20}$ hydrocarbyl radical, or $X^1$ and $X^2$ join together to form a $C_4$ to $C_{62}$ cyclic or polycyclic ring structure, provided that when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, is, independently, hydrogen, a $C_1$ to $C_{40}$ hydrocarbyl radical, or a substituted $C_1$ to $C_{40}$ hydrocarbyl radical;
optionally, wherein two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ may independently join together to form a $C_4$ to $C_{62}$ cyclic or polycyclic ring structure, or a combination thereof; and
wherein each $R^{22}$, $R^{27}$, $R^{28}$, $R^{29}$, $R^{30}$, $R^{31}$, and $R^{32}$ is, independently, hydrogen, a $C_1$ to $C_{40}$ hydrocarbyl radical, or a $C_1$ to $C_{40}$ substituted hydrocarbyl radical, optionally two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{27}$, $R^{28}$, $R^{29}$, $R^{30}$, $R^{31}$, and $R^{32}$ independently join together to form a $C_4$ to $C_{62}$ cyclic or polycyclic ring structure, or a combination thereof, and
wherein Y is a $C_1$ to $C_{40}$ divalent hydrocarbylene radical comprising a linker backbone comprising from 1 to 18 carbon atoms bridging between nitrogen atoms $N^1$ and $N^2$.

45. A catalyst compound represented by the Formula:

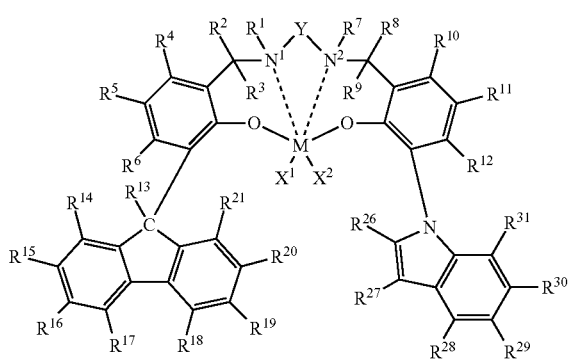

wherein N is nitrogen;
M is a Group 3, 4, 5, or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a univalent substituted $C_1$ to $C_{20}$ hydrocarbyl radical, or $X^1$ and $X^2$ join together to form a $C_4$ to $C_{62}$ cyclic or polycyclic ring structure, provided that when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, is, independently, hydrogen, a $C_1$ to $C_{40}$ hydrocarbyl radical, or a substituted $C_1$ to $C_{40}$ hydrocarbyl radical;
optionally, wherein two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ may idependently join together to form a $C_4$ to $C_{62}$ cyclic or polycyclic ring structure, or a combination thereof; and
each $R^{26}$, $R^{27}$, $R^{28}$, $R^{29}$, $R^{30}$, and $R^{31}$ is, independently, hydrogen, a $C_1$ to $C_{40}$ hydrocarbyl radical, or a $C_1$ to $C_{40}$ substituted hydrocarbyl radical, optionally two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{26}$, $R^{27}$, $R^{28}$, $R^{29}$, $R^{30}$, and $R^{31}$ independently join together to form a $C_4$ to $C_{62}$ cyclic or polycyclic ring structure, or a combination thereof, and
wherein Y is a $C_1$ to $C_{40}$ divalent hydrocarbylene radical comprising a linker backbone comprising from 1 to 18 carbon atoms bridging between nitrogen atoms $N^1$ and $N^2$.

46. A catalyst compound represented by the Formula:

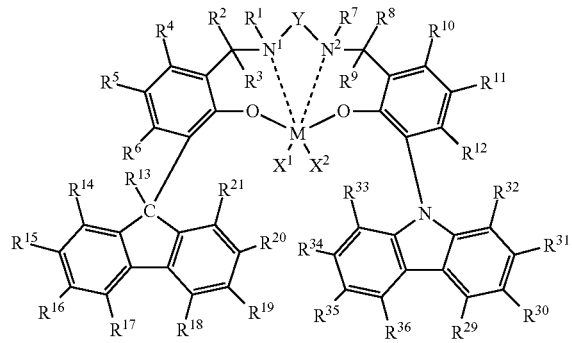

wherein N is nitrogen,
M is a Group 3, 4, 5, or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a univalent substituted $C_1$ to $C_{20}$ hydrocarbyl radical, or $X^1$ and $X^2$ join together to form a $C_4$ to $C_{62}$ cyclic or polycyclic ring structure, provided that when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, is, independently, hydrogen, a $C_1$ to $C_{40}$ hydrocarbyl radical, or a substituted $C_1$ to $C_{40}$ hydrocarbyl radical;
optionally, wherein two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ may independently join together to form a $C_4$ to $C_{62}$ cyclic or polycyclic ring structure, or a combination thereof; and
each $R^{29}$, $R^{30}$, $R^{31}$, $R^{32}$, $R^{33}$, $R^{34}$, $R^{35}$, and $R^{36}$ is, independently, hydrogen, a $C_1$ to $C_{40}$ hydrocarbyl radical, or a $C_1$ to $C_{40}$ substituted hydrocarbyl radical, optionally two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{29}$, $R^{30}$, $R^{31}$, $R^{32}$, $R^{33}$, $R^{34}$, $R^{35}$, and $R^{36}$ independently join together to form a $C_4$ to $C_{62}$ cyclic or polycyclic ring structure, or a combination thereof, and wherein Y is a $C_1$ to $C_{40}$ divalent hydrocarbylene radical comprising a linker backbone comprising from 1 to 18 carbon atoms bridging between nitrogen atoms $N^1$ and $N^2$.

47. A catalyst compound represented by the Formula:

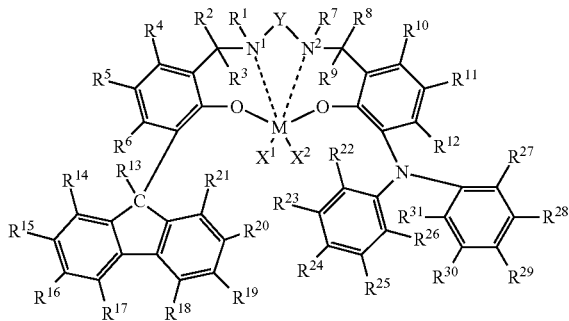

where N is nitrogen,
M is a Group 3, 4, 5, or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a univalent substituted $C_1$ to $C_{20}$ hydrocarbyl radical, or $X^1$ and $X^2$ join together to form a $C_4$ to $C_{62}$ cyclic or polycyclic ring structure, provided that when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, is, independently, hydrogen, a $C_1$ to $C_{40}$ hydrocarbyl radical, or a substituted $C_1$ to $C_{40}$ hydrocarbyl radical;
optionally, wherein two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ may independently join together to form a $C_4$ to $C_{62}$ cyclic or polycyclic ring structure, or a combination thereof; and
each $R^{22}$, $R^{23}$, $R^{24}$, $R^{25}$, $R^{26}$, $R^{27}$, $R^{28}$, $R^{29}$, $R^{30}$, and $R^{31}$ is, independently, hydrogen, a $C_1$ to $C_{40}$ hydrocarbyl radical, or a $C_1$ to $C_{40}$ substituted hydrocarbyl radical, optionally two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ independently join together to form a $C_4$ to $C_{62}$ cyclic or polycyclic ring structure, or a combination thereof, and wherein Y is a $C_1$ to $C_{40}$ divalent hydrocarbylene radical comprising a linker backbone comprising from 1 to 18 carbon atoms bridging between nitrogen atoms $N^1$ and $N^2$.

48. A catalyst compound represented by the Formula:

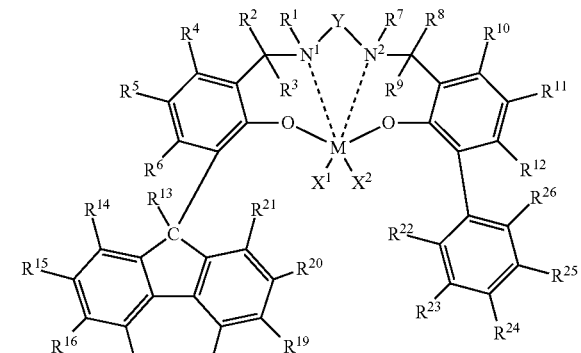

wherein
M is a Group 3, 4, 5, or 6 transition metal;
$N^1$ and $N^2$ are nitrogen;
O is oxygen;
each of $X^1$ and $X^2$ is, independently, a univalent $C_1$ to $C_{20}$ hydrocarbyl radical, a univalent substituted $C_1$ to $C_{20}$ hydrocarbyl radical, or $X^1$ and $X^2$ join together to form a $C_4$ to $C_{62}$ cyclic or polycyclic ring structure, provided that when M is trivalent $X^2$ is not present;
each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, is, independently, hydrogen, a $C_1$ to $C_{40}$ hydrocarbyl radical, or a substituted $C_1$ to $C_{40}$ hydrocarbyl radical;
optionally, wherein two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ may independently join together to form a $C_4$ to $C_{62}$ cyclic or polycyclic ring structure, or a combination thereof; and
each $R^{22}$, $R^{23}$, $R^{24}$, $R^{25}$, and $R^{26}$ is, independently, hydrogen, a $C_1$ to $C_{40}$ hydrocarbyl radical, or a $C_1$ to $C_{40}$ substituted hydrocarbyl radical, optionally two or more of $R^1$, $R^2$, $R^3$, $R^4$, $R^5$, $R^6$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, and $R^{26}$ independently
wherein Y is a $C_1$ to $C_{40}$ divalent hydrocarbylene radical comprising a linker backbone comprising from 1 to 18 carbon atoms bridging between nitrogen atoms $N^1$ and $N^2$.

* * * * *